US012784783B2

(12) United States Patent
Zhu et al.

(10) Patent No.: US 12,784,783 B2
(45) Date of Patent: Nov. 3, 2026

(54) AUDIO PROCESSING METHOD AND ELECTRONIC DEVICE

(71) Applicant: HISENSE VISUAL TECHNOLOGY CO., LTD., Qingdao (CN)

(72) Inventors: Zonghua Zhu, Qingdao (CN); Bin Li, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 19/074,087

(22) Filed: Mar. 7, 2025

(65) Prior Publication Data

US 2025/0210066 A1 Jun. 26, 2025

Related U.S. Application Data

(63) Continuation of application No. PCT/CN2023/119843, filed on Sep. 19, 2023.

(30) Foreign Application Priority Data

Dec. 14, 2022 (CN) ......................... 202211611352.1
Dec. 19, 2022 (CN) ......................... 202211632453.7

(51) Int. Cl.
*G10L 19/008* (2013.01)
*G11B 27/10* (2006.01)
(Continued)

(52) U.S. Cl.
CPC ............ *G11B 27/10* (2013.01); *G10L 19/008* (2013.01); *H04N 19/44* (2014.11); *H04R 5/033* (2013.01); *H04S 3/008* (2013.01); *H04S 2400/01* (2013.01)

(58) Field of Classification Search
CPC ...... G11B 27/10; G10L 19/008; H04N 19/44; H04N 21/439; H04R 5/033; H04R 5/04;
(Continued)

(56) References Cited

U.S. PATENT DOCUMENTS 10,129,587 B2 * 11/2018 Erickson .......... G11B 20/00007
10,431,227 B2 * 10/2019 Disch ...................... H04S 3/008
(Continued)

FOREIGN PATENT DOCUMENTS

CN 103118298 A 5/2013
CN 103916692 A 7/2014
(Continued)

OTHER PUBLICATIONS

The World Intellectual Property Organization (WIPO) International Search Report for PCT/CN2023/119843 Dec. 20, 2023 4 Pages (including translation).

(Continued)

*Primary Examiner* — Helen Shibru
(74) *Attorney, Agent, or Firm* — ANOVA LAW GROUP, PLLC

(57) ABSTRACT

The present disclosure provides an audio processing method and an electronic device. The method includes: based on that a to-be-played multimedia file includes multiple channels of audio tracks, parsing the to-be-played multimedia file to obtain the multiple channels of audio tracks of the to-be-played multimedia file; determining at least two channels of target audio tracks from the multiple channels of audio tracks, and establishing a corresponding relationship between each channel of target audio track and each playback earphone; decoding each channel of target audio track based on a preset decoder corresponding to each channel of target audio track to obtain a pulse modulation code corresponding to each channel of target audio track; playing each channel of target audio track through the playback earphone corresponding to each channel of target audio track based on the pulse modulation code corresponding to each channel of target audio track and the corresponding relationship.

20 Claims, 31 Drawing Sheets

(51) Int. Cl.
*H04N 19/44* (2014.01)
*H04R 5/033* (2006.01)
*H04S 3/00* (2006.01)

(58) Field of Classification Search
CPC . H04R 2420/03; H04R 2420/05; H04S 3/008; H04S 2400/01
USPC .......................................................... 386/201
See application file for complete search history.

(56) References Cited

U.S. PATENT DOCUMENTS

| | | | | |
|---|---|---|---|---|
| 10,693,936 | B2 * | 6/2020 | Stockhammer | H04L 65/70 |
| 10,972,853 | B2 * | 4/2021 | Kim | H04S 3/008 |
| 12,458,893 | B2 * | 11/2025 | Henderson | A63F 13/54 |
| 2012/0218445 | A1 | 8/2012 | Petilli | |
| 2014/0118616 | A1 | 5/2014 | Oughriss et al. | |
| 2020/0234772 | A1 | 7/2020 | Halperin et al. | |

FOREIGN PATENT DOCUMENTS

| | | | |
|---|---|---|---|
| CN | 105872253 | A | 8/2016 |
| CN | 105959841 | A | 9/2016 |
| CN | 108153508 | A | 6/2018 |
| CN | 109672943 | A | 4/2019 |
| CN | 112165623 | A | 1/2021 |
| CN | 112399252 | A | 2/2021 |
| CN | 114827679 | A | 7/2022 |
| CN | 115223579 | A | 10/2022 |
| CN | 116261008 | A | 6/2023 |
| WO | 2006075079 | A1 | 7/2006 |
| WO | 2018126613 | A1 | 7/2018 |

OTHER PUBLICATIONS

China National Intellectual Property Administration (CNIPA) Office Action 1 for Application No. 202211611352.1 Jan. 20, 2024 15 Pages (including translation).

Cheng Jiaqian, "Research and implementation of paralleliaztion of hevc video decoding module for national standard video system". College of Software Engineering, Southeast University Mar. 15, 2022.

China National Intellectual Property Administration (CNIPA) Notification to Grant Patent Right for Invention No. 202211611352.1 May 21, 2024 6 Pages (including translation).

* cited by examiner

AUDIO PROCESSING METHOD AND ELECTRONIC DEVICE

CROSS REFERENCE TO RELATED APPLICATION

This application is a continuation of International Application No. PCT/CN2023/119843, filed on Sep. 19, 2023, which claims priorities to Chinese Patent Application No. 202211611352.1 filed on Dec. 14, 2022, and Chinese Patent Application No. 202211632453.7 filed on Dec. 19, 2022, all of which are hereby incorporated by reference in their entireties.

TECHNICAL FIELD

The present disclosure relates to the technical field of audio processing, and in particular to an audio processing method and an electronic device.

BACKGROUND

Currently, when a user plays a video through a smart device, since the smart device only supports single-channel audio track output, multiple channels of audio tracks contained in a played video are only played according to a default audio track of a smart device system, or a single-channel audio track determined by a user to be played among the multiple channels of audio tracks, while other audio tracks are prohibited from being played. As a result, in a scenario with multiple users, it is impossible to play the audio track corresponding to the needs of each user. That is, the related art cannot meet the needs of each user and play multiple channels of audio tracks.

SUMMARY

Embodiments of the present disclosure provides an audio processing method, including: based on that a to-be-played multimedia file comprises multiple channels of audio tracks, parsing the to-be-played multimedia file to obtain the multiple channels of audio tracks of the to-be-played multimedia file; determining at least two channels of target audio tracks from the multiple channels of audio tracks, and establishing a corresponding relationship between each channel of target audio track and each playback earphone; decoding each channel of target audio track based on a preset decoder corresponding to each channel of target audio track to obtain a pulse modulation code corresponding to each channel of target audio track; playing each channel of target audio track through the playback earphone corresponding to each channel of target audio track based on the pulse modulation code corresponding to each channel of target audio track and the corresponding relationship between each channel of target audio track and each playback earphone.

Embodiments of the present disclosure provides an electronic device, including: a memory configured to store computer instructions; a processor, connected with the memory, and is configured to execute the following steps when executing the computer instructions: based on that a to-be-played multimedia file comprises multiple channels of audio tracks, parsing the to-be-played multimedia file to obtain the multiple channels of audio tracks of the to-be-played multimedia file; determining at least two channels of target audio tracks from the multiple channels of audio tracks, and establishing a corresponding relationship between each channel of target audio track and each playback earphone; decoding each channel of target audio track based on a preset decoder corresponding to each channel of target audio track to obtain a pulse modulation code corresponding to each channel of target audio track; playing each channel of target audio track through the playback earphone corresponding to each channel of target audio track based on the pulse modulation code corresponding to each channel of target audio track and the corresponding relationship between each channel of target audio track and each playback earphone.

DETAILED DESCRIPTION

The embodiments will be described in detail below, and embodiments thereof are shown in the accompanying drawings. When the following description refers to the drawings, unless otherwise indicated, the same numbers in different drawings represent the same or similar elements. It should be noted that the brief description of the terms in the present disclosure is only for the convenience of understanding the implementation methods described below, and is not intended to limit the implementation methods of the present disclosure. Unless otherwise indicated, these terms should be understood according to their common and usual meanings.

Figure 1A:
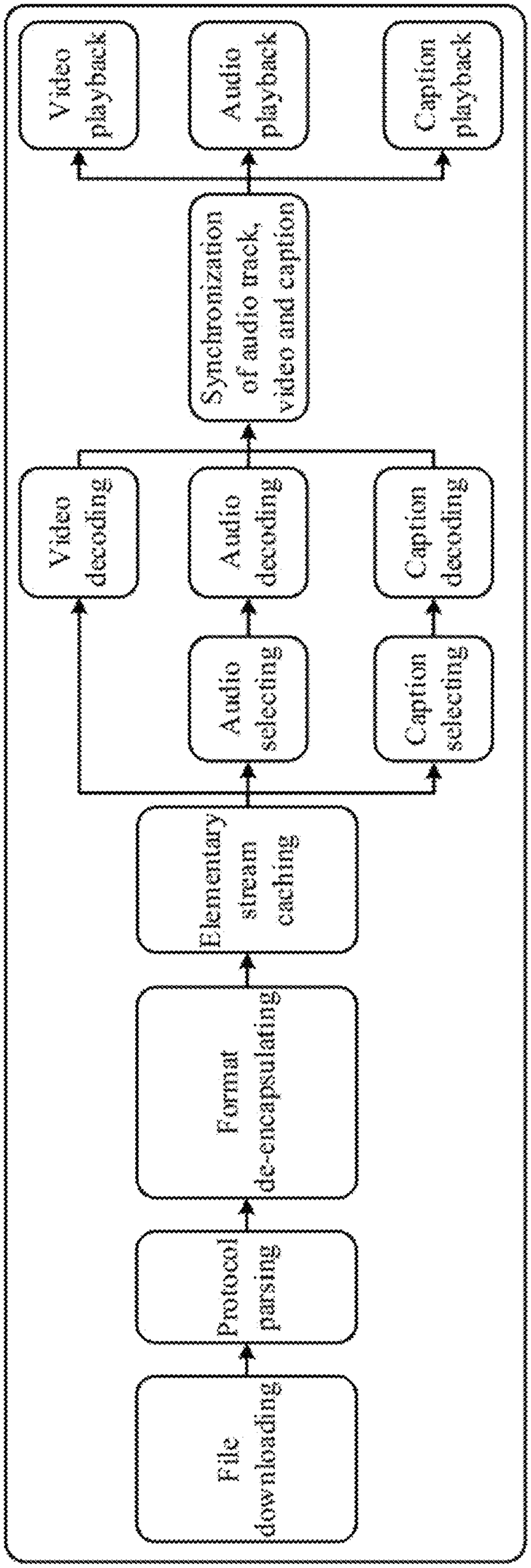
FIG. 1A is a schematic diagram of a process of playing through a single-channel audio track according to some embodiments.

FIG. 1A is a schematic diagram of a process of playing through a single-channel audio track according to some embodiments. As shown in FIG. 1A, when using a smart device such as a smart TV to play a video, a user inputs a play instruction. The smart TV first downloads a to-be-played playback file from a local device or a server. After the playback file is downloaded, when the playback file is a streaming media playback file, the streaming media playback file is parsed by a protocol de-capsulation module to obtain an address corresponding to a media segment contained in the streaming media playback file, and the media segment is downloaded based on the address. After the media segment contained in the media playback file is obtained, a format de-capsulation module is used to parse the file, thereby extracting different audio elementary streams, video elementary streams, and caption elementary streams contained in the playback file, and caching them, thereby ensuring that the video can be played smoothly. It should be noted that if the playback file contains multiple channels of audio tracks, multiple channels of audio tracks can be parsed, and the user selects a to-be-played target audio track from the multiple channels of audio tracks through a selector. At the same time, a caption selector determines the corresponding to-be-played caption based on the target audio track selected from the user, and then decodes the target audio track, video and captions for synchronous playback.

Figure 1B:
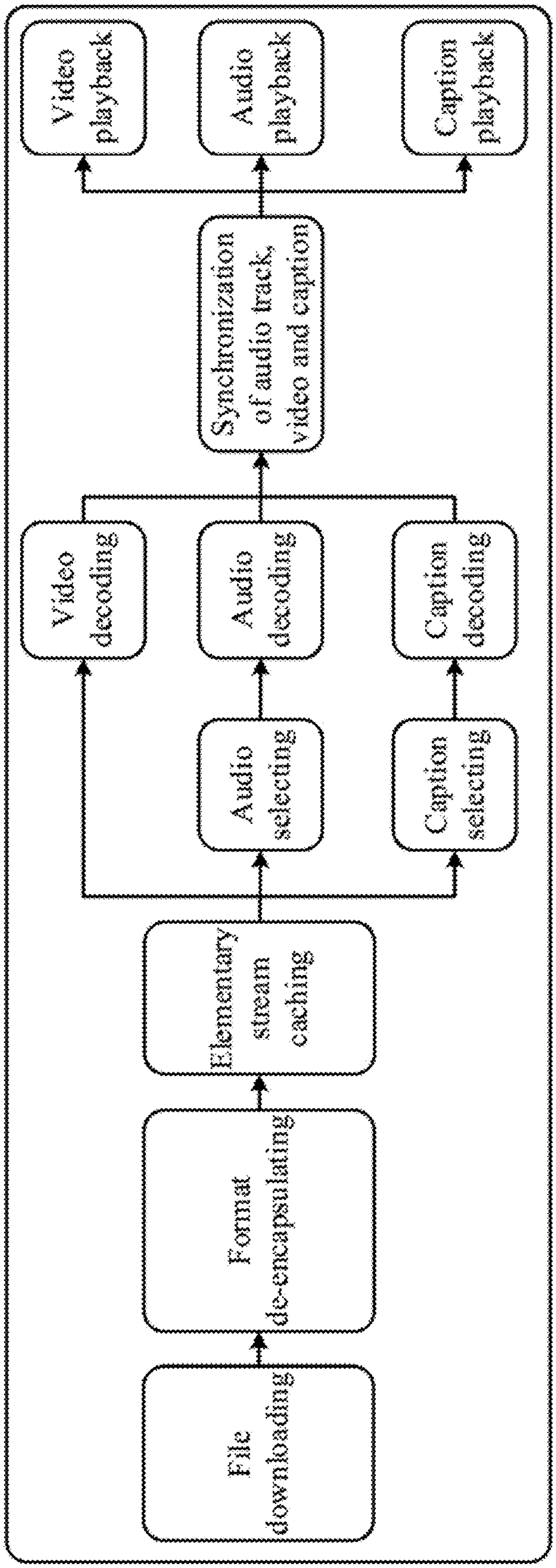
FIG. 1B is a schematic diagram of another process of playing through a single-channel audio track according to some embodiments.

FIG. 1B is a schematic diagram of another process of playing through a single-channel audio track according to some embodiments. As shown in FIG. 1B, when the playback file is not a streaming media playback file, there is no need to parse the streaming media playback file through the protocol de-capsulation module to obtain the address corresponding to the media segment contained in the streaming media playback file, and download the media segment based on the address.

However, using the above method, when a video is played through a smart device, the smart device only supports an output of a single-channel audio track. For multiple channels of audio tracks contained in the played video, a single-channel audio track is played according to a default audio track of a smart device system, or a to-be-played single-channel audio track determined by a user from the multiple channels of audio tracks and multiple channels of audio tracks cannot be played.

In order to solve the above problems, the embodiments of the present disclosure provide an audio processing method, including: based on that a to-be-played multimedia file includes multiple channels of audio tracks, parsing the to-be-played multimedia file to obtain the multiple channels of audio tracks of the to-be-played multimedia file; determining at least two channels of target audio tracks from the multiple channels of audio tracks, and establishing a corresponding relationship between each channel of target audio track and each playback earphone; decoding each channel of target audio track based on a preset decoder corresponding to each channel of target audio track to obtain a pulse modulation code corresponding to each channel of target audio track; playing each channel of target audio track through the playback earphone corresponding to each channel of target audio track based on the pulse modulation code corresponding to each channel of target audio track and the corresponding relationship between each channel of target audio track and each playback earphone. In the above process, the multiple channels of target audio tracks that need to be played according to different user needs can be determined from the multiple channels of audio tracks contained in the to-be-played multimedia file, and a corresponding relationship between each channel of target audio track and each playback earphone can be established, so that different playback earphones can play the multiple channels of target audio tracks contained in the same to-be-played multimedia file at the same time, realize the playback of multiple channels of audio tracks, meet audio playback needs of different users for the to-be-played multimedia file, so that each user can listen to the audio they need, and improve the user experience.

The audio processing model training method and the audio processing method provided by the embodiments of the present disclosure can be implemented based on an electronic device, or a functional module or functional entity in the electronic device.

The electronic device can be a smart TV, a personal computer (PC), a server, a mobile phone, a tablet computer, a laptop computer, a mainframe computer, etc., which is not specifically limited in the embodiments of the present disclosure.

Figure 2:
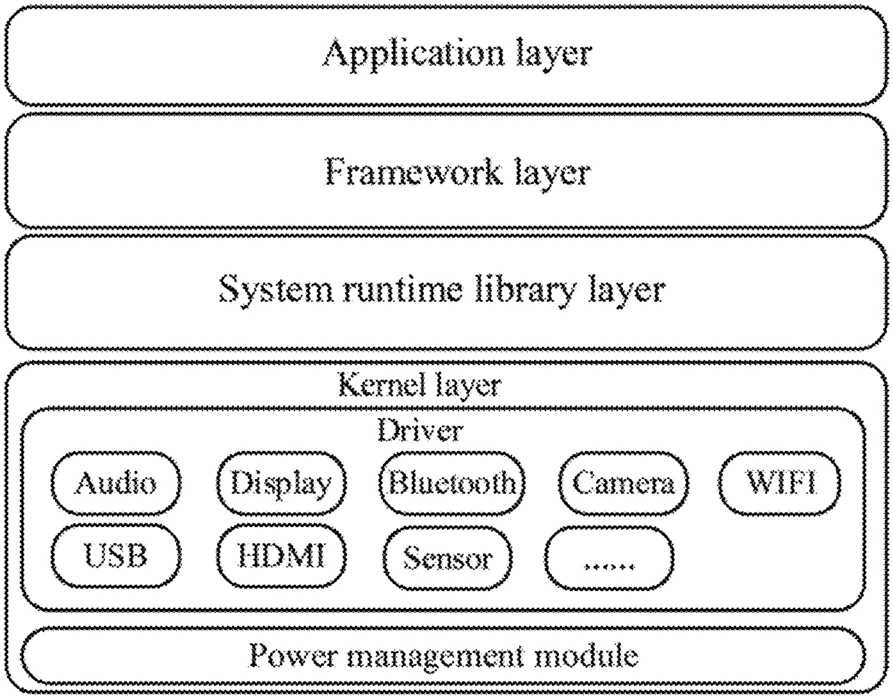
FIG. 2 is a schematic diagram of software configuration of an electronic device according to some embodiments.

FIG. 2 is a schematic diagram of software configuration of an electronic device according to some embodiments. As shown in FIG. 2, the system is divided into four layers, from top to bottom, namely, an application (Applications) layer (referred to as "application layer"), an application framework (Application Framework) layer (referred to as "framework layer"), an Android runtime (Android runtime) and system library layer (referred to as "system runtime library layer"), and a kernel layer.

In some embodiments, at least one application is running in the application layer, and these applications can be window programs, system settings programs, clock programs, etc., provided by an operating system, or applications developed by third-party developers. In specific implementations, application packages in the application layer are not limited to the above embodiments.

The framework layer provides application programming interfaces (APIs) and programming frameworks for applications. The application framework layer includes some predefined functions. The application framework layer is equivalent to a processing center that determines actions that applications in the application layer take. Through the API interface, applications can access system resources and obtain system services during execution.

In some embodiments, the system runtime library layer provides support for the upper layer, namely the framework layer. When the framework layer is used, the Android operating system will run a C/C++ library contained in the system runtime library layer to implement the functions to be implemented by the framework layer.

In some embodiments, the kernel layer is a layer between hardware and software. The kernel layer includes at least one of the following drivers: audio driver, display driver, Bluetooth driver, camera driver, WIFI driver, USB driver, HDMI driver, sensor driver (such as fingerprint sensor, temperature sensor, pressure sensor, etc.), and power driver, etc.

The audio processing method provided in the embodiments of the present disclosure can be implemented based on the above-mentioned electronic device.

In order to explain the present solutions in more detail, the following will be explained in an exemplary manner in conjunction with FIG. 3A. It can be understood that the steps involved in FIG. 3A can include more steps or fewer steps in actual implementations, and the order of these steps can also be different, so as to implement the audio processing method provided in the embodiments of the present disclosure.

Figure 3A:
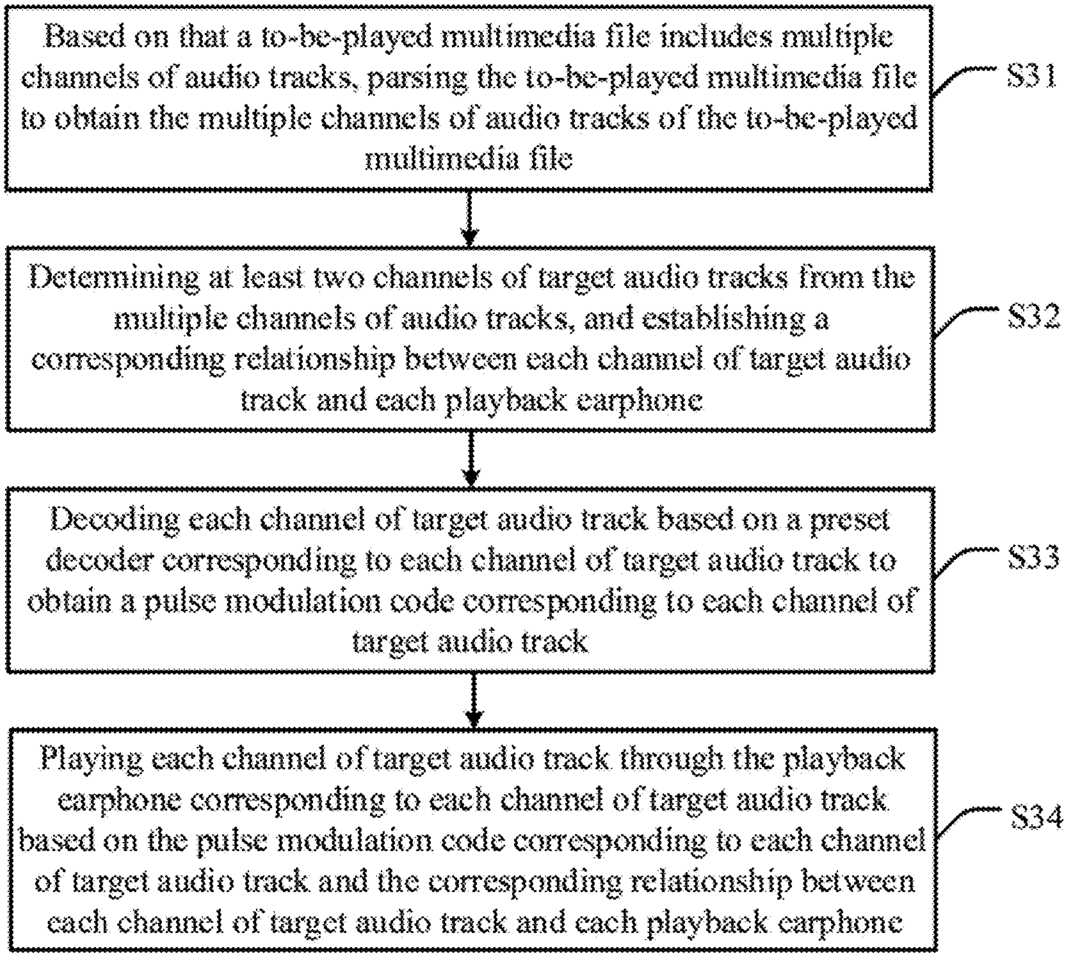
FIG. 3A is a schematic flow chart of an audio processing method according to some embodiments.

FIG. 3A is a flow chart of an audio processing method according to some embodiments. The method of the embodiments is performed by an audio processing device (electronic device) applied to a smart device, and the device can be implemented in hardware and/or software. As shown in FIG. 3A, the audio processing method specifically includes the following steps.

S31, based on that a to-be-played multimedia file includes multiple channels of audio tracks, parsing the to-be-played multimedia file to obtain the multiple channels of audio tracks of the to-be-played multimedia file.

Here, the audio track refers to attribute information corresponding to an audio contained in the to-be-played multimedia file. Each to-be-played audio contained in the to-be-played multimedia file corresponds to an audio track, such as language, timbre, timbre library, number of channels, input/output port, volume, but not limited to this. The present disclosure does not specifically limit it, and those skilled in the art can set it according to actual conditions.

Specifically, based on that the to-be-played multimedia file contains multiple channels of audio tracks, the to-be-played multimedia file is parsed to obtain the multiple channels of audio tracks contained in the to-be-played multimedia file.

For example, when a user uses a smart device such as a smart TV to play a XXX movie, it is determined based on file information of the XXX movie that the XXX movie contains 5 channels of audio tracks. That is, the XXX movie file currently contains 5 languages for the user to choose from. After determining that the XXX movie contains 5 channels of audio tracks, the XXX movie is parsed to obtain the corresponding 5 channels of audio tracks, but is not limited to this. The present disclosure does not specifically limit this, and those skilled in the art can set it according to actual conditions.

The above-mentioned analysis and processing of the to-be-played multimedia file refers to the related art, which will not be repeated here.

S32, determining at least two channels of target audio tracks from the multiple channels of audio tracks, and establishing a corresponding relationship between each channel of target audio track and each playback earphone.

Here, the playback earphones are used to play audio, that is, to play a target audio corresponding to a target audio track. One playback earphone corresponds to one target audio track, so as to avoid interference between multiple users using different audio tracks when watching the same to-be-played multimedia file, such as watching XXX movies in different languages. The playback earphones can be, for example, Bluetooth earphones, but are not limited to this. The present disclosure does not specifically limit this, and those skilled in the art can set it according to actual conditions.

Specifically, after parsing the to-be-played multimedia file and obtaining multiple channels of audio tracks contained in the to-be-played multimedia file, two or more channels of to-be-played target audio tracks are determined from the multiple channels of audio tracks. Since each channel of target audio track requires a playback earphone to play, it is necessary to establish a corresponding relationship between each channel of target audio track and each playback earphone.

Optionally, based on the above embodiments, in some embodiments of the present disclosure, at least two channels of target audio tracks can be determined from multiple channels of audio tracks according to a selection instruction input from a user.

Figure 3B:
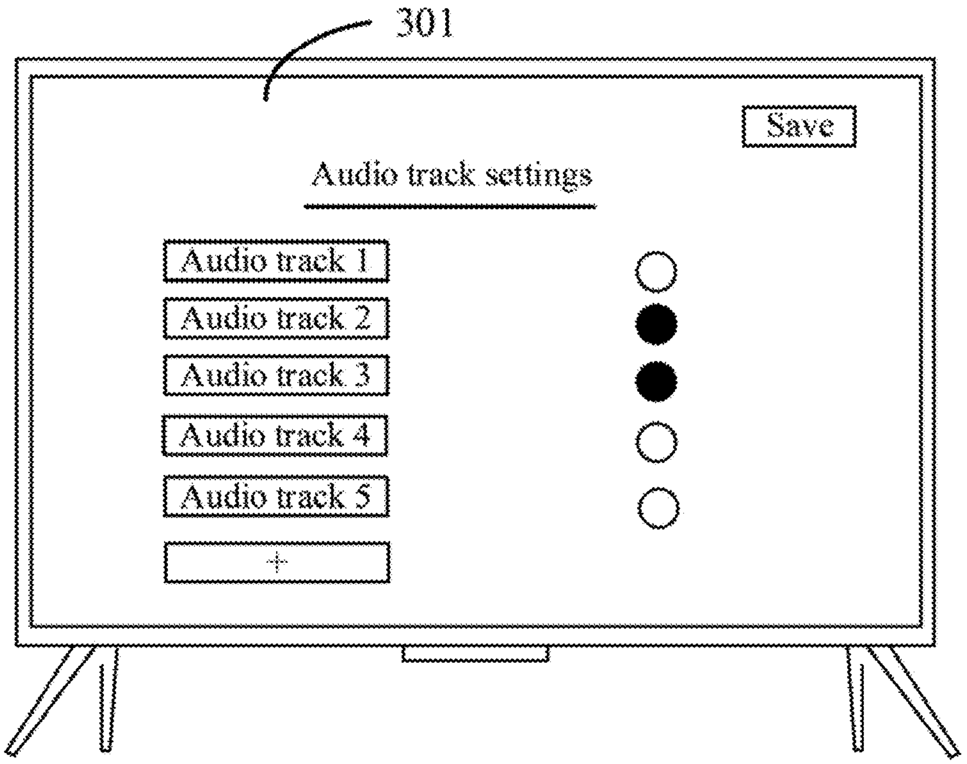
FIG. 3B is a schematic diagram of determining a target audio track among multiple channels of audio tracks according to some embodiments.

Exemplarily, referring to FIG. 3B, FIG. 3B is a schematic diagram of determining a target audio track from multiple channels of audio tracks according to some embodiments. According to the needs of different users, each user inputs a selection instruction on a display interface 301 of a smart device such as a smart TV, and determines from the multiple channels of audio tracks that Audio Track 2 and Audio Track 3 are target audio tracks that different users need to play.

Optionally, based on the above embodiments, in some embodiments of the present disclosure, establishing the corresponding relationship between each channel of target audio track and each playback headphone can be done by determining the order in which the playback headphones are connected to the smart device and the order in which multiple channels of target audio tracks are determined, so as to determine the corresponding relationship between each channel of target audio track and each playback headphone, or the corresponding relationship can be configured through user customization.

S33, decoding each channel of target audio track based on a preset decoder corresponding to each channel of target audio track to obtain a pulse modulation code corresponding to each channel of target audio track.

Here, pulse modulation coding refers to digital sampling processing of analog signals, that is, the coding method of converting audio signals into digital signals, which mainly goes through sampling, quantization and encoding. Specifically, the sampling process converts a continuous-time audio signal into a sampling signal with discrete-time and continuous-amplitude, the quantization process converts a sampling signal into a digital signal with discrete-time and discrete-amplitude, and the encoding process encodes a quantized digital signal into a binary code group output. After obtaining the pulse modulation code corresponding to each channel of target audio track, the pulse modulation code can be used for rendering and playback.

Specifically, for each channel of target audio track, a decoding process is performed on each channel of target audio track according to a preset decoder corresponding to each channel of target audio track, so as to obtain a pulse modulation code corresponding to each channel of target audio track.

It should be noted that the above is a decoding process for an elementary stream corresponding to each channel of target audio track. The specific decoding process refers to the related art and will not be repeated here.

S34, playing each channel of target audio track through the playback earphone corresponding to each channel of target audio track based on the pulse modulation code corresponding to each channel of target audio track and the corresponding relationship between each channel of target audio track and each playback earphone.

Specifically, after obtaining the pulse modulation code corresponding to each channel of target audio track, according to the corresponding relationship between each channel of target audio track and each playback earphone, each channel of target audio track is played through the playback earphone corresponding to each channel of target audio track and rendering by using the pulse modulation code corresponding to each channel of target audio track.

Figure 3C:
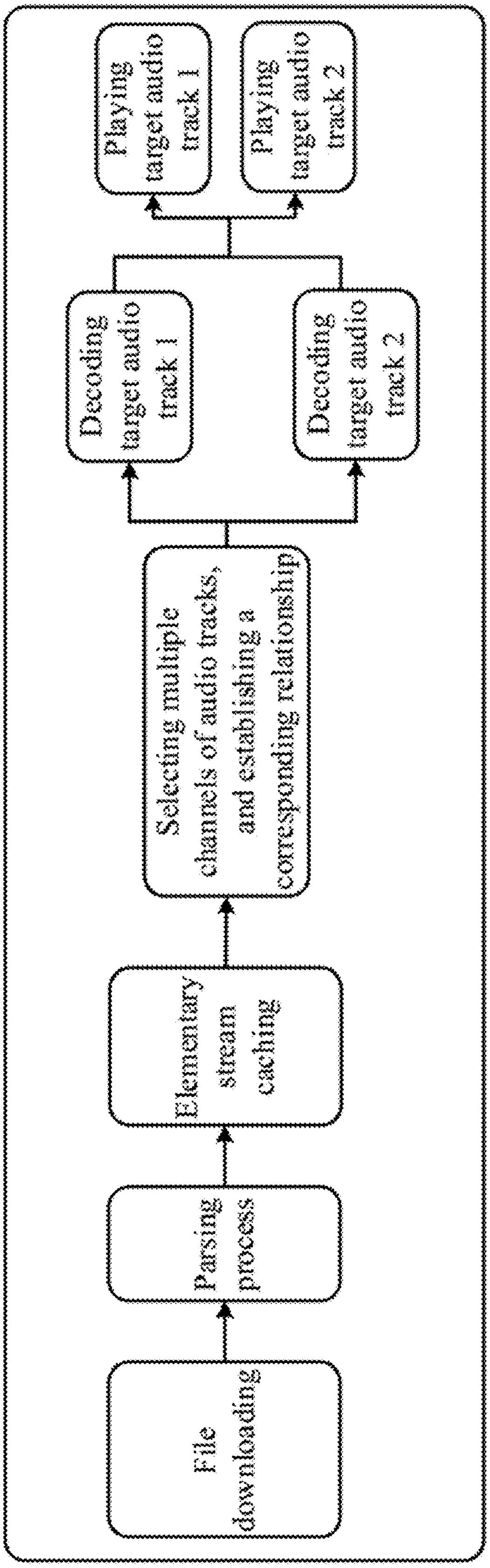
FIG. 3C is a schematic diagram of a process of playing through multiple channels of audio tracks according to some embodiments.

Optionally, FIG. 3C is a schematic diagram of a process of playing multiple channels of audio tracks according to some embodiments. The specific implementation process refers to the above steps S31-S34, which will not be described in detail here.

In this way, the embodiments of the present disclosure provide an audio processing method, including: based on that a to-be-played multimedia file includes multiple channels of audio tracks, parsing the to-be-played multimedia file to obtain the multiple channels of audio tracks of the to-be-played multimedia file; determining at least two channels of target audio tracks from the multiple channels of audio tracks, and establishing a corresponding relationship between each channel of target audio track and each playback earphone; decoding each channel of target audio track based on a preset decoder corresponding to each channel of target audio track to obtain a pulse modulation code corresponding to each channel of target audio track; playing each channel of target audio track through the playback earphone corresponding to each channel of target audio track based on the pulse modulation code corresponding to each channel of target audio track and the corresponding relationship between each channel of target audio track and each playback earphone. In the above process, the multiple channels of target audio tracks that need to be played according to different user needs can be determined from the multiple channels of audio tracks contained in the to-be-played multimedia file, and a corresponding relationship between each channel of target audio track and each playback earphone can be established, so that different playback earphones can play the multiple channels of target audio tracks contained in the same to-be-played multimedia file at the same time, realize the playback of multiple channels of audio tracks, meet audio playback needs of different users for the to-be-played multimedia file, so that each user can listen to the audio they need, and improve the user experience.

Figure 4A:
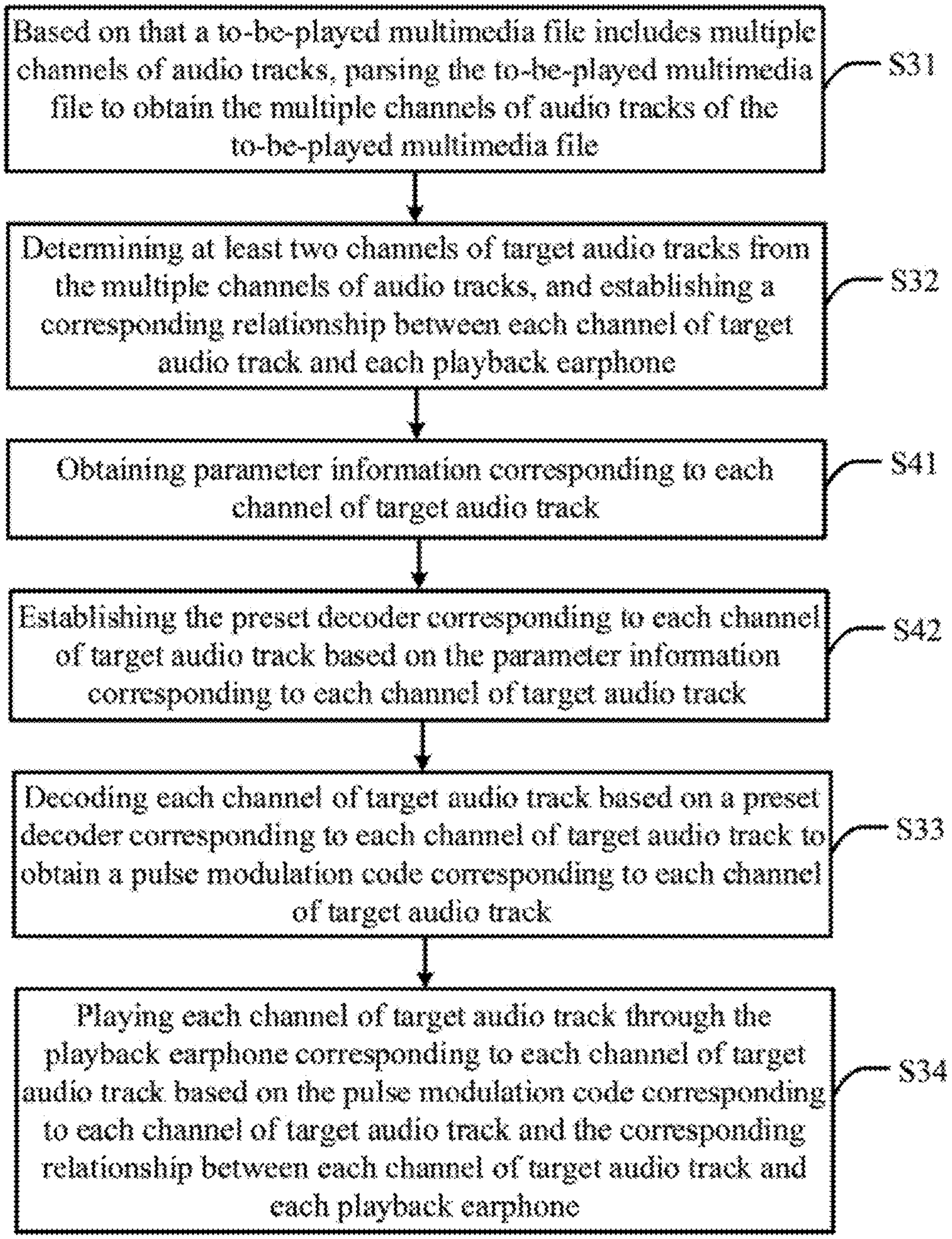
FIG. 4A is a flowchart of another audio processing method according to some embodiments.

FIG. 4A is a flow chart of another audio processing method according to some embodiments. These embodiments are further expanded and optimized on the basis of the above embodiments. Optionally, referring to FIG. 4A, before executing S33, the method further includes the following steps.

S41, obtaining parameter information corresponding to each channel of target audio track.

The parameter information includes, but is not limited to, an audio sampling rate, the number of soundtracks, and a bit rate. The present disclosure does not specifically limit this, and those skilled in the art can set it according to actual conditions.

S42: establishing the preset decoder corresponding to each channel of target audio track based on the parameter information corresponding to each channel of target audio track.

Here, the preset decoder includes a hard decoder and a soft decoder. The hard decoder is a decoder established based on an independent hardware chip. The hard decoder can improve the decoding efficiency of the target audio track. The soft decoder is a decoder established according to the encoding.

Specifically, for each channel of target audio track, the parameter information corresponding to each channel of target audio track is obtained, such as the audio sampling rate, the number of soundtracks and the bit rate, and a corresponding decoder is established for each channel of target audio track according to the parameter information corresponding to each channel of target audio track.

Figure 4B:
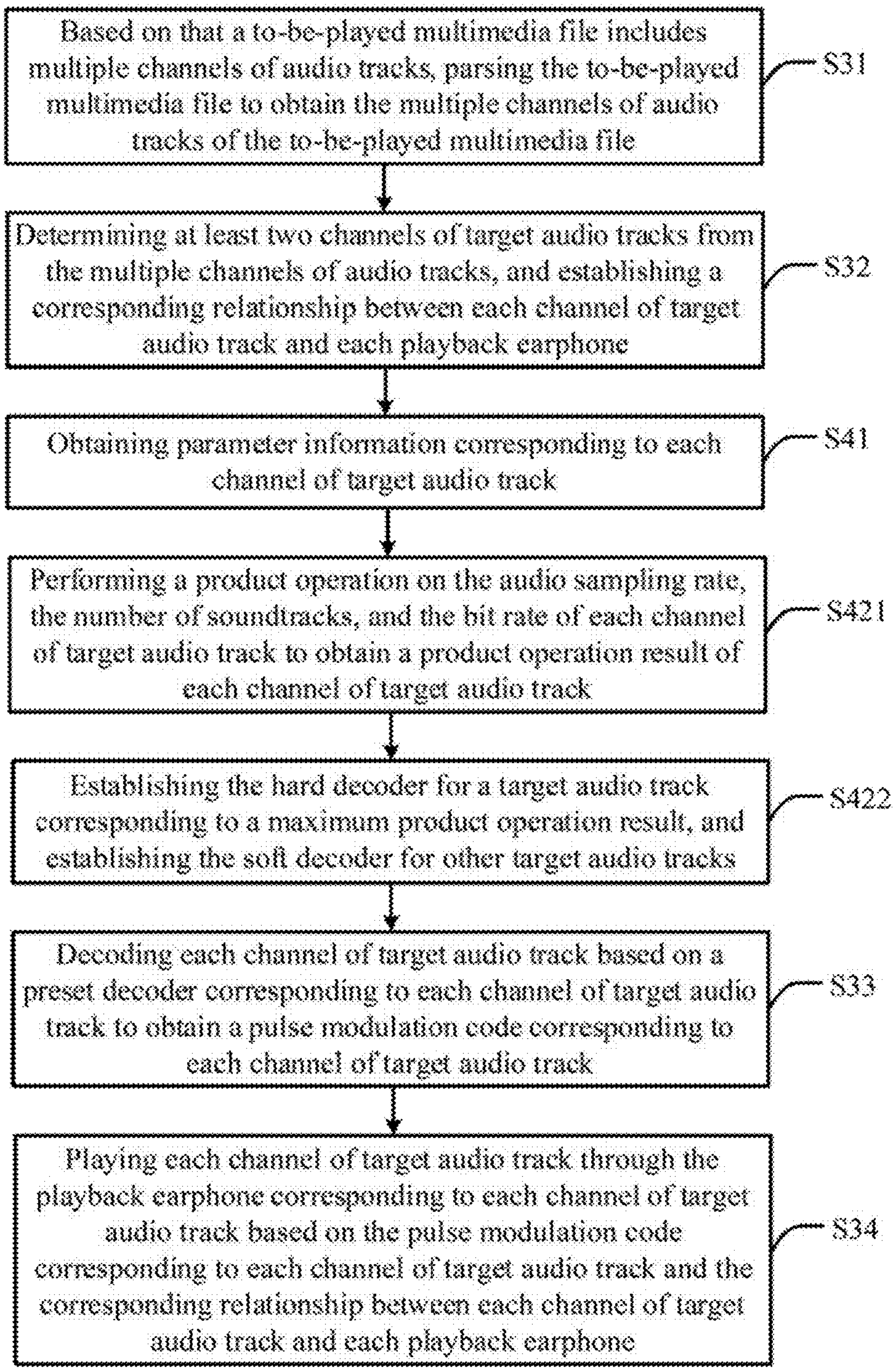
FIG. 4B is a flowchart of yet another audio processing method according to some embodiments.

Optionally, based on the above embodiments, FIG. 4B is a flowchart of another audio processing method according to some embodiments. This embodiment is further expanded and optimized on the basis of the above embodiments. Optionally, referring to FIG. 4B, an implementation of S42 can includes the following steps.

S421, performing a product operation on the audio sampling rate, the number of soundtracks, and the bit rate of each channel of target audio track to obtain a product operation result of each channel of target audio track.

Specifically, after obtaining the audio sampling rate, the number of soundtracks and the bit rate of each channel of target audio track, a product operation is performed on the audio sampling rate, the number of soundtracks and the bit rate of each channel of target audio track to calculate and obtain the product operation result of each channel of target audio track.

It should be noted that, by calculating the product operation result of each channel of target audio track, a target audio track corresponding to the maximum product operation result can be determined as an optimal target audio track among multiple channels of target audio tracks, that is, a target audio track with the best playback sound quality.

S422, establishing the hard decoder for a target audio track corresponding to a maximum product operation result, and establishing the soft decoder for other target audio tracks.

Specifically, after calculating the product operation result of each channel of target audio track, for the target audio track with the maximum product operation result, since the target audio track is the optimal target audio track among multiple channels of target audio tracks, that is, the target audio track with the best playback quality, and since more resources are required when decoding the target audio track, a hard decoder is established for the optimal target audio track, and resources in the decoding process are provided through a hardware chip, thereby improving the efficiency of decoding the target audio track corresponding to the maximum product operation result. For other target audio tracks, a soft decoder is established.

Exemplarily, following the above embodiment, for the 5 channels of audio tracks contained in the to-be-played multimedia file: audio track 1, audio track 2, audio track 3, audio track 4 and audio track 5, it is determined that audio track 2 and audio track 3 are two channels of target audio tracks, namely, target audio track 1 and target audio track 2, and the audio sampling rate, the number of soundtracks and the bit rate respectively corresponding to the target audio track 1 and the target audio track 2 are obtained, and a product operation is performed to obtain a product operation result 1 and a product operation result 2 respectively corresponding to the target audio track 1 and the target audio track 2, and it is determined that the product operation result 1 is greater than the product operation result 2, so a hard decoder is established for the target audio track 1, and a soft decoder is established for the target audio track 2, which is not limited herein, the present disclosure is not specifically limited, and those skilled in the art can set it according to actual conditions.

In this way, the audio processing method provided in the embodiments of the present disclosure, in the above process, a product operation is performed according to the audio sampling rate, the number of soundtracks and the bit rate corresponding to each channel of target audio track, a hard decoder for the target audio track corresponding to the maximum product operation result is established according to the product operation result, and a soft decoder is established for other target audio tracks. In this way, independent hardware chips can be used to provide resources during the decoding process of the target audio track with the best sound quality, thereby improving the efficiency of decoding the best target audio track, saving resources of the smart device, and also ensuring the efficiency of decoding other target audio tracks to a certain extent.

Figure 5A:
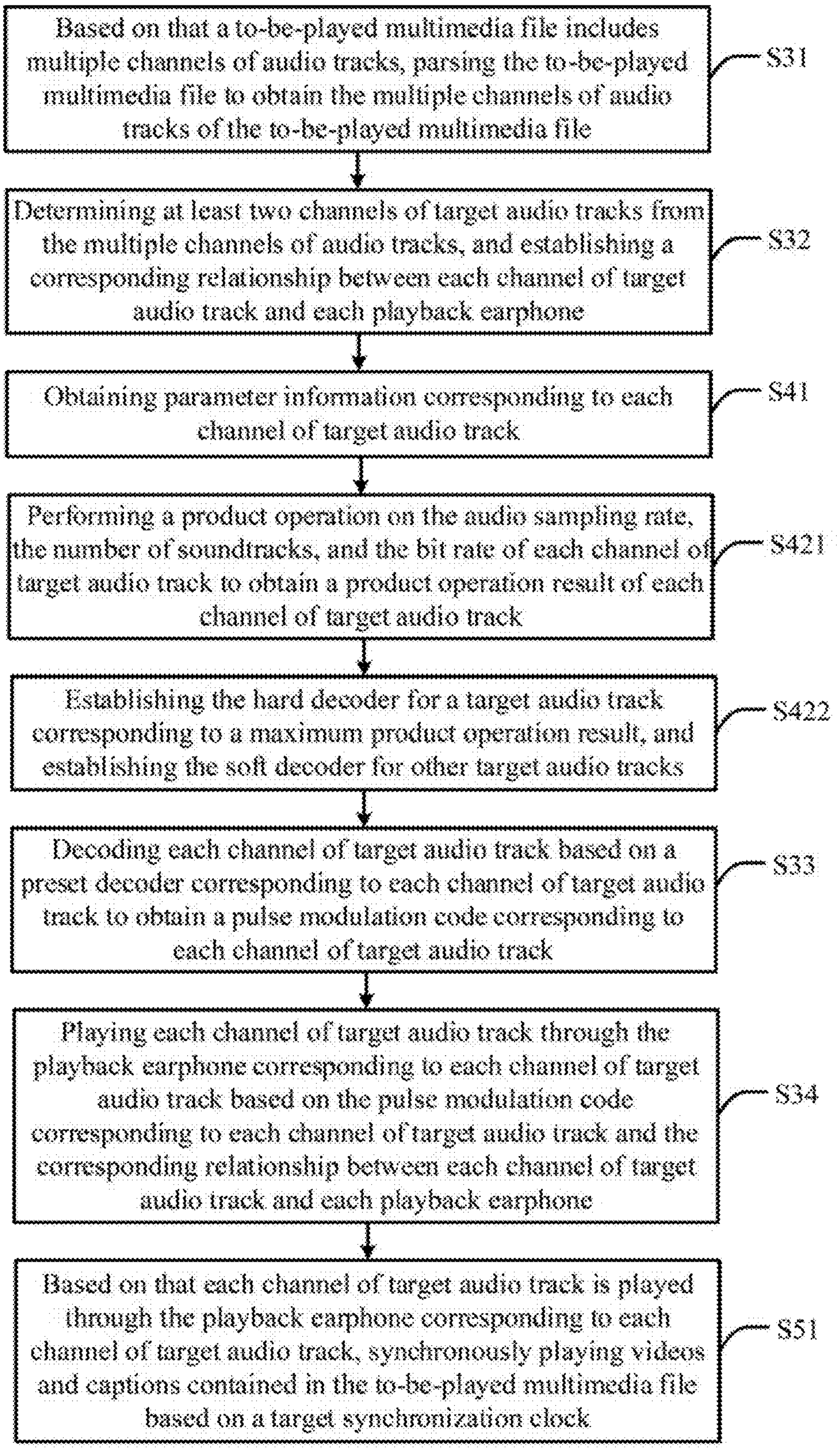
FIG. 5A is a flowchart of another audio processing method according to some embodiments.
Figure 5B:
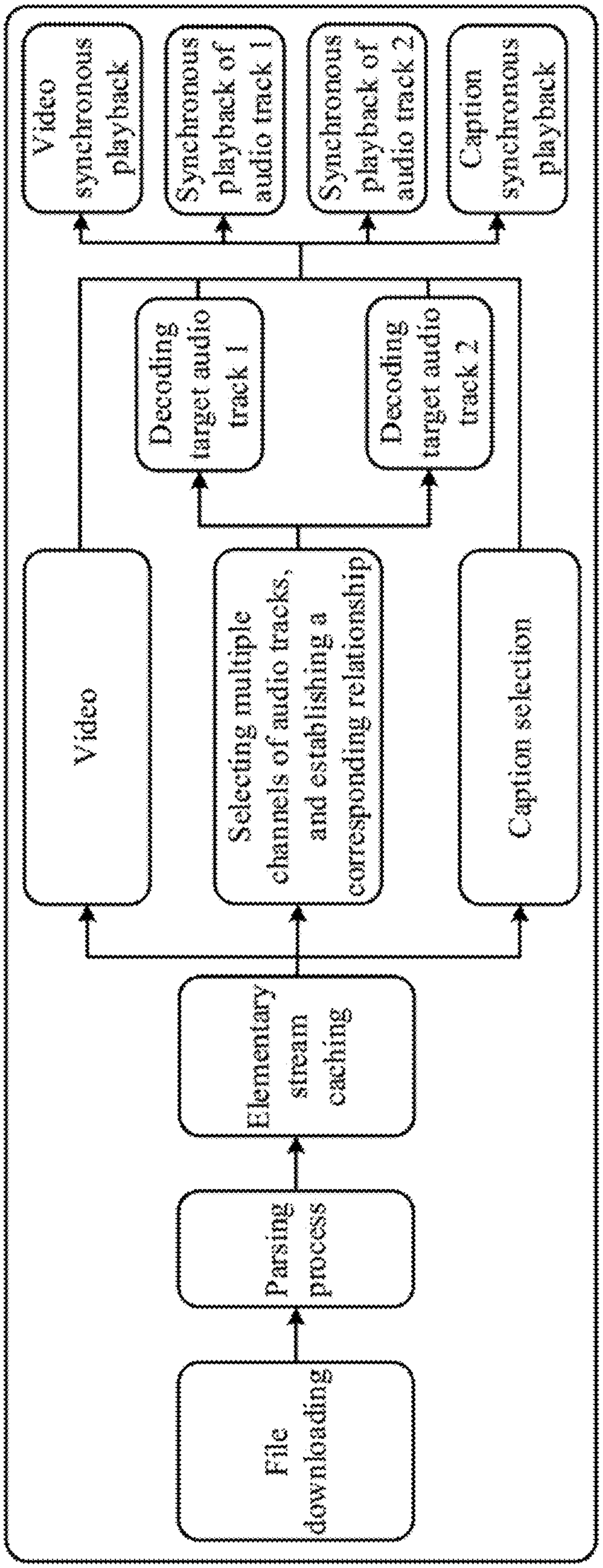
FIG. 5B is a schematic diagram of another process of playing through multiple channels of audio tracks according to some embodiments.

Optionally, FIG. 5A is a flowchart of another audio processing method according to some embodiments. FIG. 5B is a flowchart of another process of playing through multiple channels of audio tracks according to some embodiments. This embodiment is further expanded and optimized on the basis of the above embodiment. Referring to FIG. 5A, when executing S34, the method further includes the following steps.

S51, based on that each channel of target audio track is played through the playback earphone corresponding to each channel of target audio track, synchronously playing videos and captions contained in the to-be-played multimedia file based on a target synchronization clock.

Here, the target synchronization clock is used to ensure that multiple channels of target audio tracks, captions and videos can be played synchronously.

Specifically, when the target audio track is played through the playback earphone corresponding to each channel of target audio track, the videos and captions included in the to-be-played multimedia file are played accordingly according to the target synchronization clock.

In this way, the audio processing method provided in the embodiments of the present disclosure utilizes the target synchronization clock in the above process to ensure that the video, captions, and multiple channels of target audio tracks contained in the to-be-played multimedia file can be played synchronously.

Figure 6A:
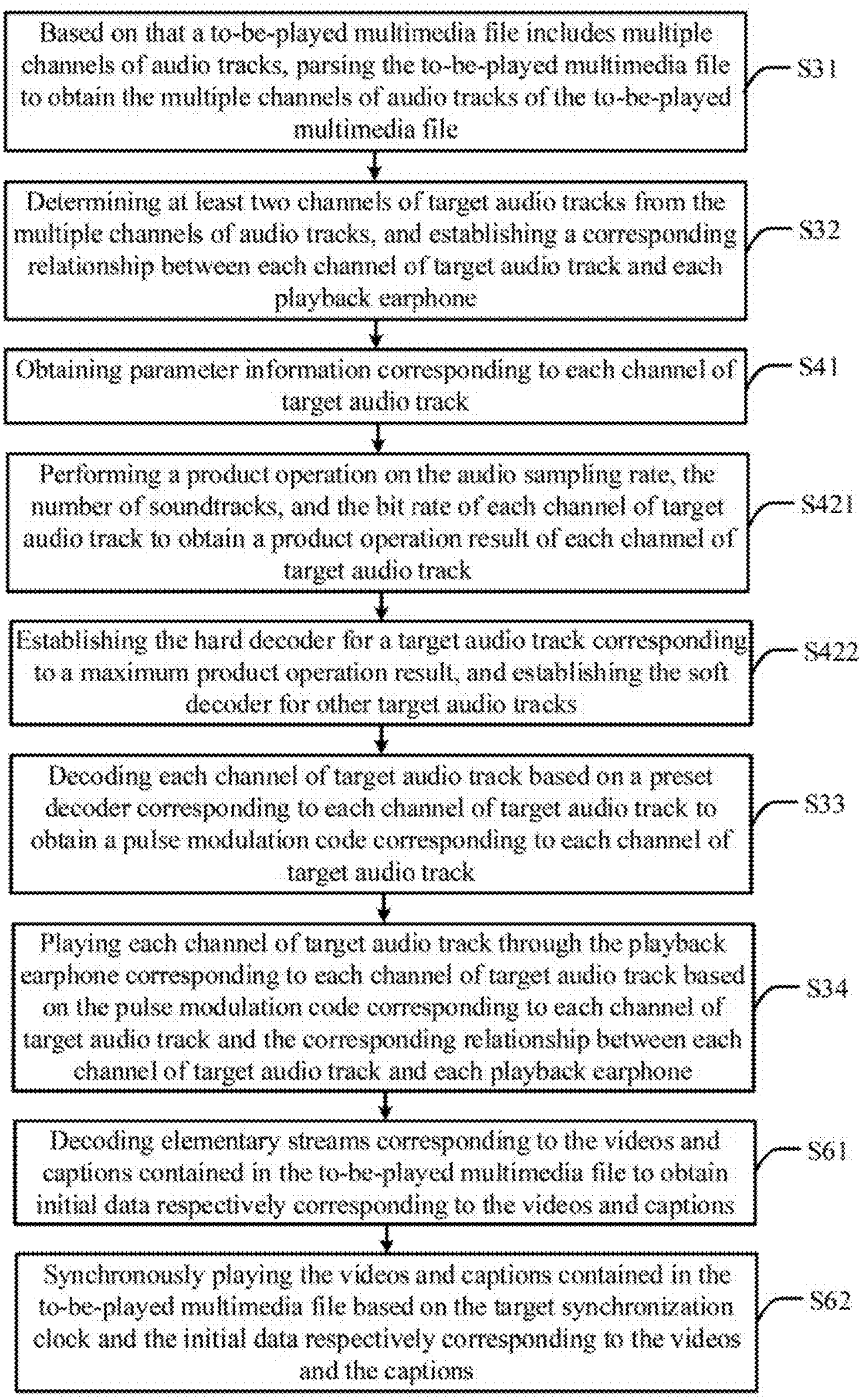
FIG. 6A is a flowchart of another audio processing method according to some embodiments.
Figure 6B:
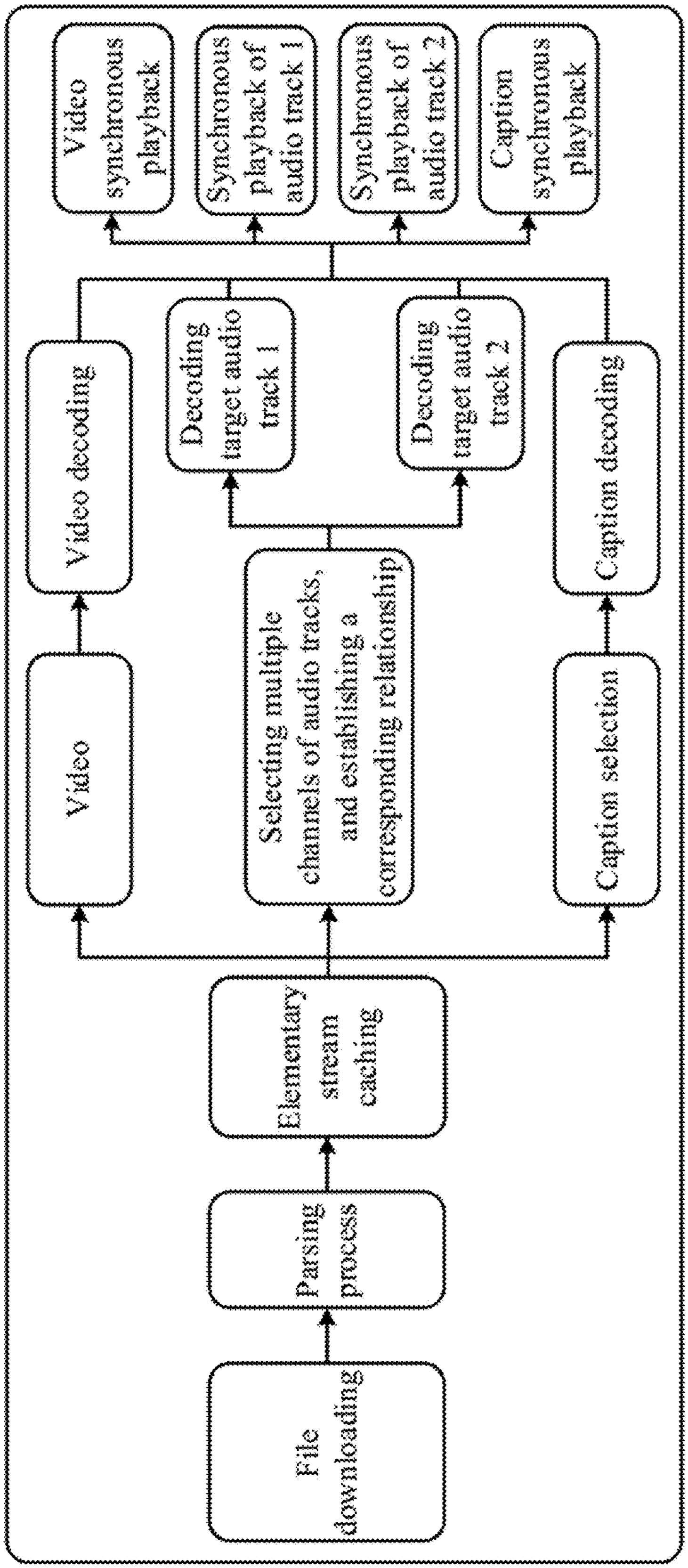
FIG. 6B is a schematic diagram of another process of playing through multiple channels of audio tracks according to some embodiments.

Optionally, FIG. 6A is a flowchart of another audio processing method according to some embodiments. FIG. 6B is a flowchart of another process of playing through multiple channels of audio tracks according to some embodiments. This embodiment is further expanded and optimized on the basis of the above embodiment. Referring to FIG. 6A, an implementation of S51 can includes the following steps.

S61, decoding elementary streams corresponding to the videos and captions contained in the to-be-played multimedia file to obtain initial data respectively corresponding to the videos and captions.

The initial data refers to uncompressed original data respectively corresponding to the videos and captions.

Specifically, for the videos and captions contained in the to-be-played multimedia file, the elementary stream of the videos is decoded according to the decoder corresponding to the video, and the elementary stream of the captions is decoded according to the decoder corresponding to the captions, so as to obtain the original data before compression corresponding to the videos and captions respectively. The specific process of elementary stream decoding processing refers to the related art and will not be repeated here.

S62, synchronously playing the videos and captions contained in the to-be-played multimedia file based on the target synchronization clock and the initial data respectively corresponding to the videos and the captions.

Specifically, after obtaining the initial data respectively corresponding to the videos and captions, the initial data corresponding to the videos and captions are used for rendering according to the target synchronization clock, so as to synchronously play the videos and captions contained in the to-be-played multimedia file with multiple channels of target audio tracks.

Figure 7:
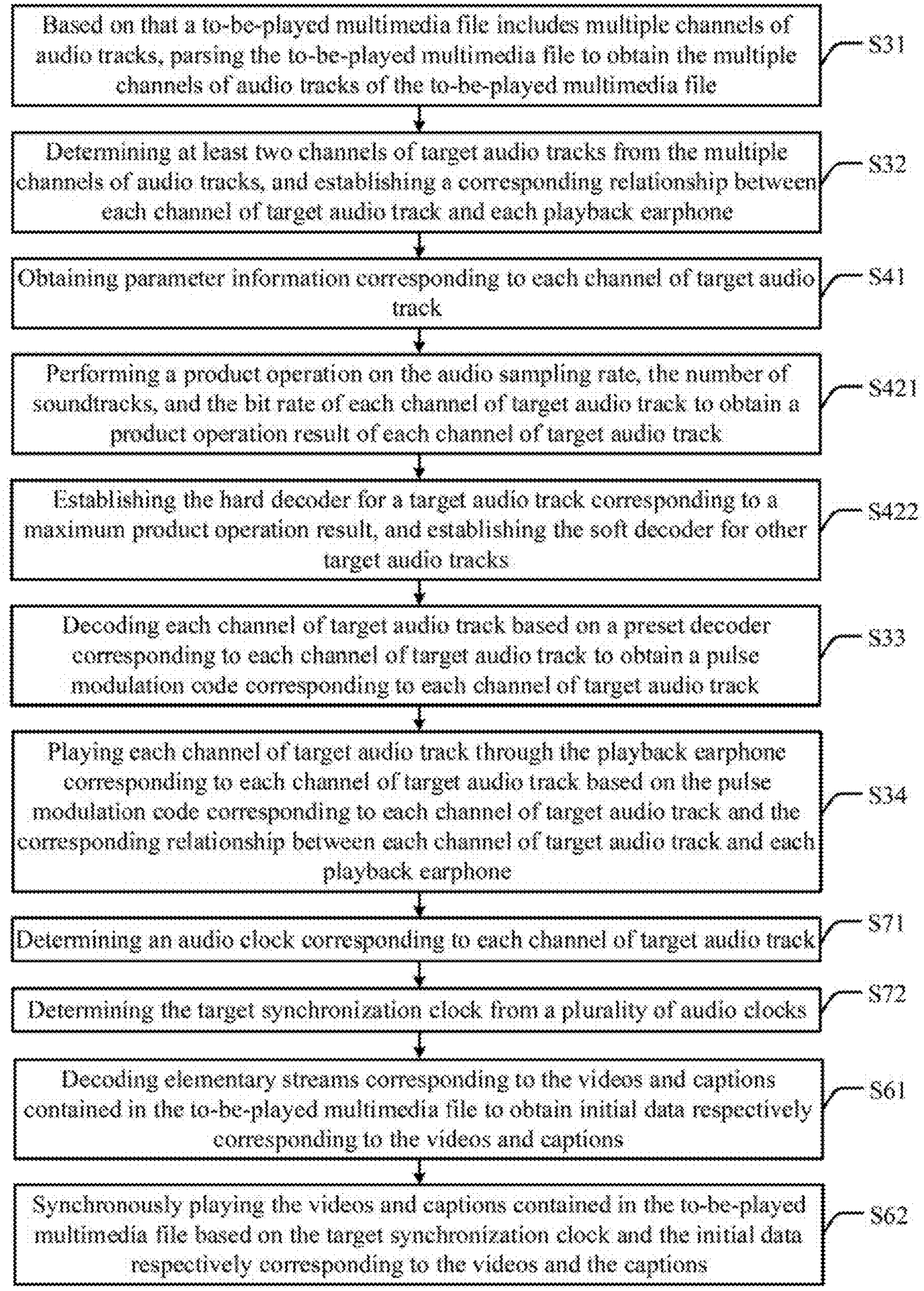
FIG. 7 is a flowchart of another audio processing method according to some embodiments.

Optionally, FIG. 7 is a flowchart of another audio processing method according to some embodiments. This embodiment is further expanded and optimized on the basis of the above embodiment. Referring to FIG. 7, before executing S61, the method further includes the following steps.

S71, determining an audio clock corresponding to each channel of target audio track.

S72, determining the target synchronization clock from a plurality of audio clocks.

The target synchronization clock is used to synchronously play the video, captions and at least two channels of target audio tracks contained in the to-be-played multimedia file.

Specifically, for the multiple channels of target audio tracks determined from the multiple channels of audio tracks, for each channel of target audio track in the multiple channels of target audio tracks, an audio clock corresponding to each channel of target audio track is determined, and an audio clock is selected from the plurality of audio clocks as the target audio track for synchronously playing the videos, captions and at least two channels of target audio tracks contained in the to-be-played multimedia file.

Figure 8:
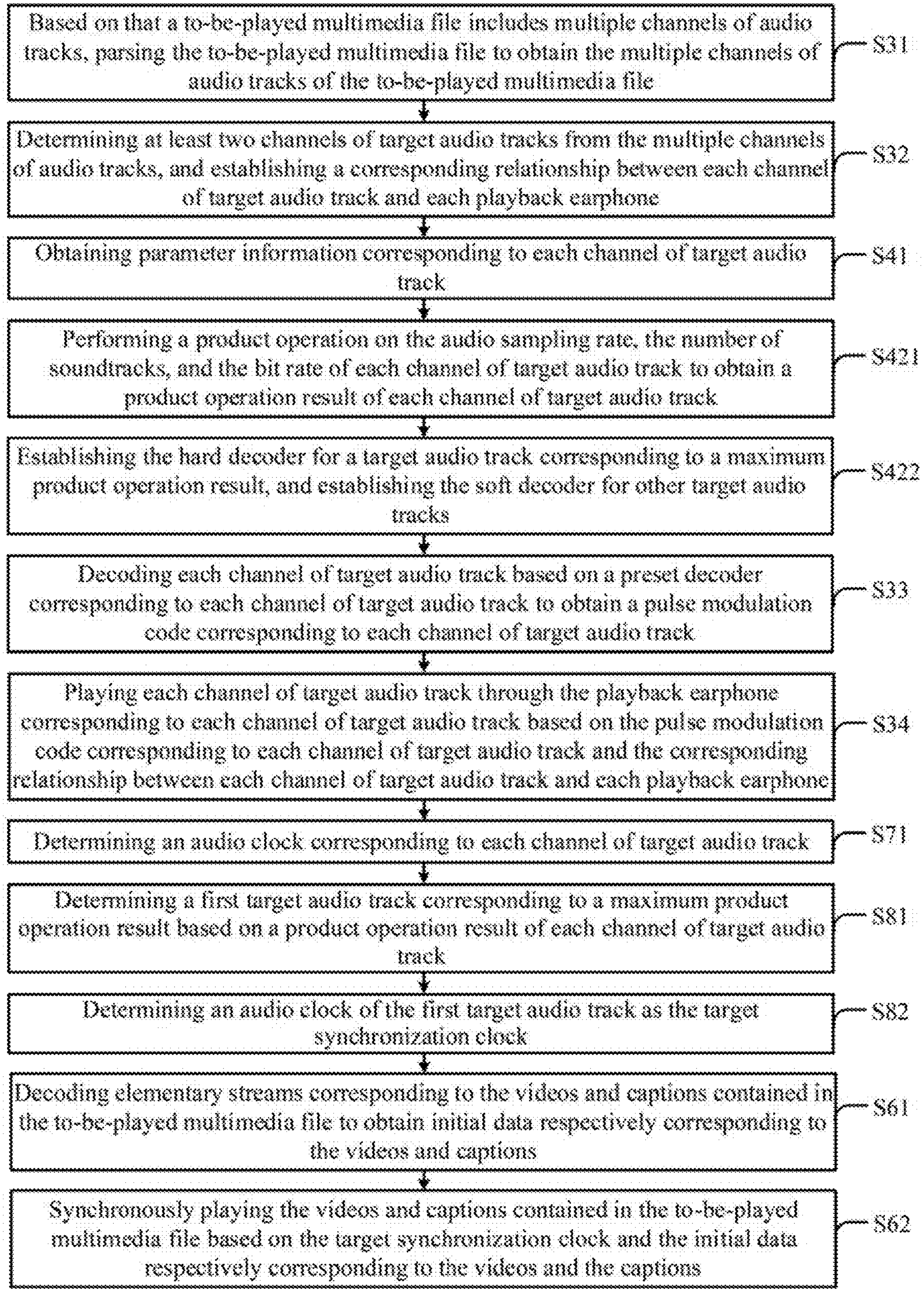
FIG. 8 is a flowchart of yet another audio processing method according to some embodiments.

Optionally, based on the above embodiment, in some embodiments of the present disclosure, the implementation of S72 includes but is not limited to the following two methods. Optionally, FIG. 8 is a flowchart of another audio processing method according to some embodiments. This embodiment is further expanded and optimized on the basis of the above embodiment. Referring to FIG. 8, an implementation of S72 can includes the following steps.

S81, determining a first target audio track corresponding to a maximum product operation result based on a product operation result of each channel of target audio track.

S82, determining an audio clock of the first target audio track as the target synchronization clock.

Specifically, since the product operation is performed through the parameter information corresponding to each channel of target audio track, namely, the audio sampling rate, the number of soundtracks and the bit rate, the product operation result corresponding to each channel of target audio track is obtained, it is possible to determine that the first target audio track corresponding to the maximum product operation result is the playback audio track with the best sound quality among multiple channels of target audio tracks. Therefore, according to the product operation result of each channel of target audio track, after determining the first target audio track corresponding to the maximum product operation result, the audio clock of the first target audio track is used as the target synchronization clock, so that other target audio tracks and the videos and captions included in the to-be-played multimedia file can be played synchronously.

In this way, the audio processing method provided in the embodiments of the present disclosure, in the above process, the playback audio track with the best sound quality among the multiple channels of target audio tracks is determined according to the parameter information corresponding to each channel of target audio track, and the audio clock corresponding to the target audio track with the best sound quality is used as the target synchronization clock, so as to ensure the smoothness of rendering and playback of the videos, captions and multiple channels of target audio tracks during the playback of the to-be-played multimedia file, making the playback smoother.

Figure 9:
FIG. 9 is a flowchart of yet another audio processing method according to some embodiments.

Optionally, based on the above embodiment, FIG. 9 is a flowchart of another audio processing method according to some embodiments. This embodiment is further expanded and optimized on the basis of the above embodiment. Referring to FIG. 9, another implementation of S72 can includes the following steps.

S91, based on that a corresponding preset decoder is established for each channel of target audio track, determining a second target audio track corresponding to a preset decoder that is a last audio track to finish the establishment.

S92: determining an audio clock of the second target audio track as the target synchronization clock.

Specifically, for each channel of target audio track, a corresponding preset decoder needs to be established. When respectively establishing corresponding preset decoders for multiple channels of target audio tracks, the second target audio track for which the preset decoder is established is determined, and the audio clock corresponding to the second target audio track is used as the target synchronization clock, so that other target audio tracks, videos and captions included in the to-be-played multimedia file can be played synchronously.

In this way, the audio processing method provided in the embodiments of the present disclosure, in the above process, the audio clock corresponding to the second target audio track of the preset decoder that is finally completed to be established is used as the target synchronization clock, thereby ensuring the smoothness of rendering and playback of videos, captions and multiple target audio tracks during the playback of the to-be-played multimedia file, making the playback smoother.

Thus, the audio processing method provided in the embodiments of the present disclosure, in the above process, optionally, on the basis of the above embodiments, in some embodiments of the present disclosure, further includes:

when a switching instruction input from the user is received, the target audio track currently being played is switched.

Specifically, for the to-be-played multimedia file, when different users play the target audio tracks corresponding to their respective needs, when there is a user who needs to switch the target audio track to be played, the smart device receives a switching instruction input from the user, and in response to the switching instruction input from the user, switches the target audio track being played by the user, and then plays the target audio track that the user currently needs to listen to.

It should be noted that during the switching process of the target audio track, when the switched target audio track is any one channel of target audio track or multiple channels of target audio tracks corresponding to the soft decoder, or the target audio track corresponding to the hard decoder, when the switching is completed, the audio clock corresponding to the hard decoder is still used as the target synchronization clock to play the videos, captions and multiple channels of target audios contained in the to-be-played multimedia file.

Optionally, when all the currently playing multiple channels of target audio tracks are switched, a target synchronization clock is further re-determined in the process of switching the multiple channels of target audio tracks. The specific implementation method of the target synchronization clock is determined, with reference to the above embodiments S81-S82, or S91-S92. The present disclosure does not specifically limit it, and those skilled in the art can set it according to actual conditions.

In this way, the audio processing method provided in the embodiments of the present disclosure can, in the above process, switch the target audio track in real time according to the user's demand for the audio track to be played during the playing of the to-be-played multimedia file, thereby improving the user experience.

Here, when the target audio track is played through the playback headphone corresponding to each channel of target audio track, the process of playing the captions included in the to-be-played multimedia file can be performed in the manner provided in the following embodiments.

Figure 10:
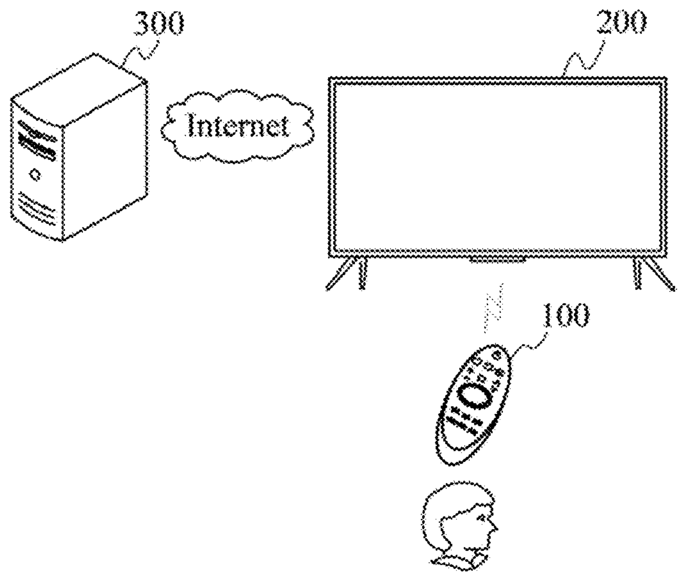
FIG. 10 is a scenario architecture diagram of a caption display method according to some embodiments.

FIG. 10 is a schematic diagram of a scene architecture of a method for controlling a display device according to some embodiments. As shown in FIG. 10, the scene architecture provided by the embodiments of the present disclosure includes: a control device 100, a display device 200 and a server 300.

The display device provided in the embodiments of the present disclosure can have various implementation forms. For example, the display device can be a television, a smart speaker refrigerator with a display function, a curtain with a display function, a personal computer (PC), a laser projection device, a monitor, an electronic bulletin board, a wearable device, a vehicle-mounted device, an electronic table, etc.

In some embodiments, the control device 100 can be a remote controller. The communication between the remote controller and the display device includes infrared protocol communication or Bluetooth protocol communication, and other short-distance communication methods. The display device is controlled wirelessly or wired. The user can input user commands through buttons on the remote controller, voice input, control panel input, etc., to control the display device.

In some embodiments, the control device 100 can be a terminal device. For example, the terminal device can be a mobile terminal such as a mobile phone, a tablet computer, a computer, or a laptop computer, etc.

In some embodiments, the display device can also be controlled in a manner other than the control device. For example, the user's selection operation can be directly received by a user selection receiving module configured inside the display device.

In some embodiments, the display device can also be in data communication with the server 300 to obtain relevant media resources from the server 300. The display device can communicate with the server through a local area network (LAN) or a wireless local area network (WLAN). The server 300 can provide media resource services and various content and interactions to the display device. The server 300 can be a cluster or multiple clusters, and can include one or more types of servers.

Figure 11:
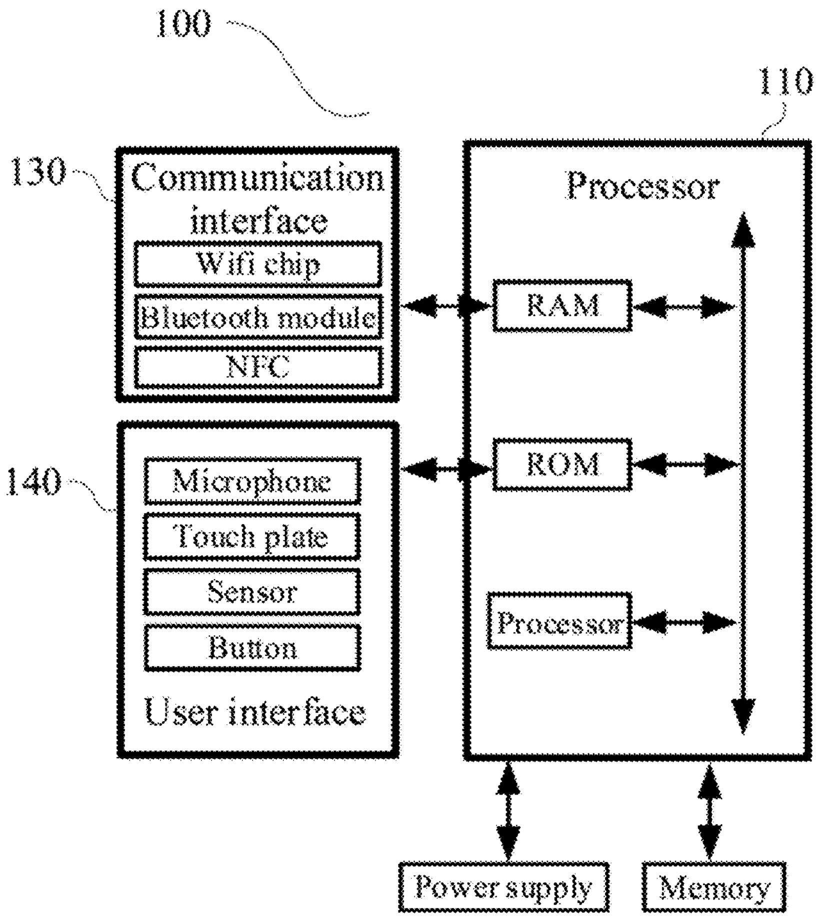
FIG. 11 is a block diagram of hardware configuration of a control device according to some embodiments.

FIG. 11 is hardware configuration block diagram of a control device according to some embodiments. FIG. 11 exemplarily shows a configuration block diagram of a control device 100 in the embodiment shown in FIG. 10. As shown in FIG. 11, the control device 100 includes a processor 110, a communication interface 130, a user interface 140, a memory, and a power supply. The control device 100 can receive an operation instruction input from a user, and convert the operation instruction into an instruction that can be recognized and responded by the display device, and forward the operation instruction or the instruction obtained by converting a voice instruction to the display device, thereby playing the role of an interactive intermediary between the user and the display device.

In some embodiments, the user interface 140 of the control device 100 is configured to perform the following steps: receiving a selection operation from a user.

In some embodiments, the user interface 140 of the control device 100 is further configured to perform the following steps: receiving a deletion operation from a user, where the deletion operation is used to stop the synchronous display of the first caption in the to-be-output captions.

In some embodiments, the user interface 140 of the control device 100 is further configured to perform the following steps: receiving an adding operation of the user, where the adding operation is used to add a synchronous display of a second caption other than the to-be-output captions.

Figure 12:
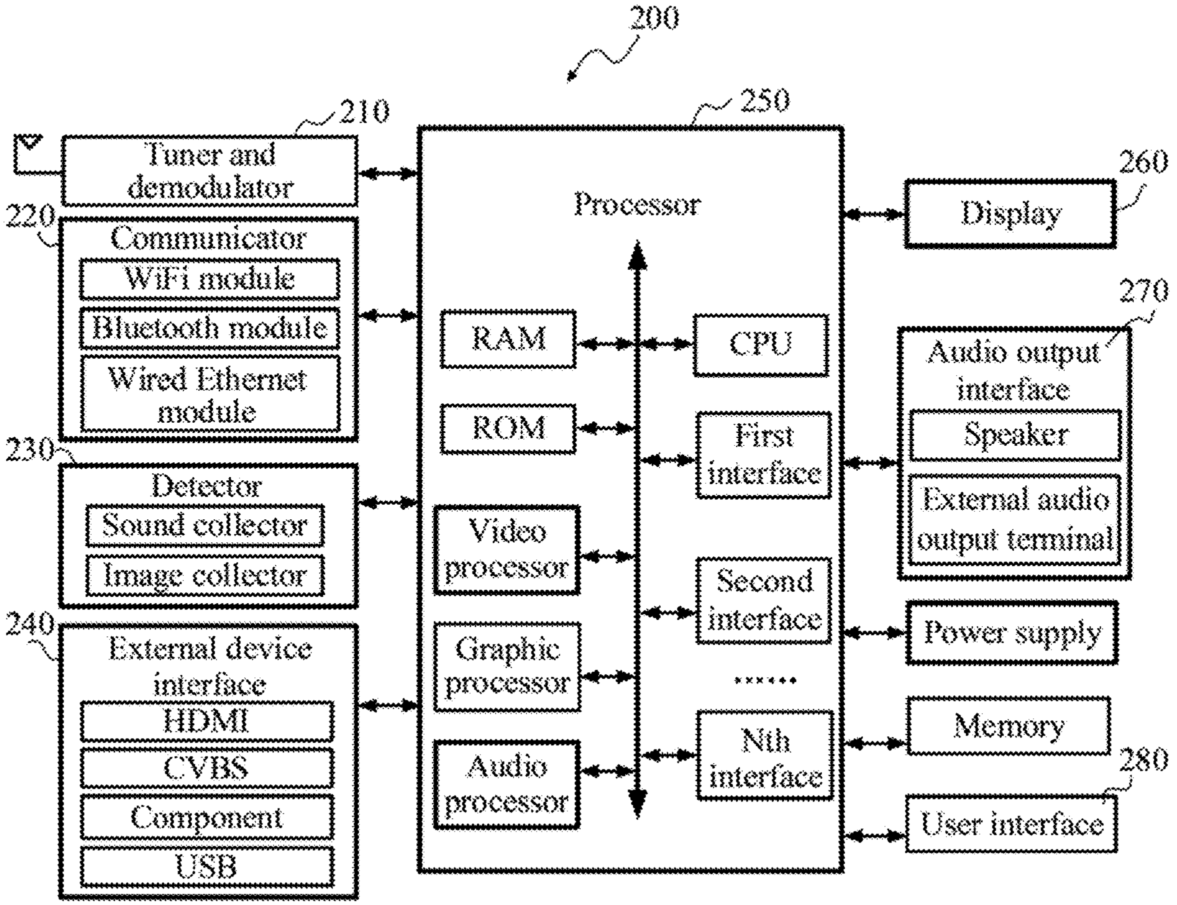
FIG. 12 is a block diagram of hardware configuration of a display device according to some embodiments.

FIG. 12 is a hardware configuration block diagram of a display device according to some embodiments. As shown in FIG. 12, the display device includes at least one of a tuner and demodulator 210, a communicator 220, a detector 230, an external device interface 240, a processor 250, a display 260, an audio output interface 270, a memory, a power supply, and a user interface 280.

In some embodiments, the processor 250 includes one or more processors, for example, a video processor, an audio processor, a graphics processor, RAM, ROM, and first to nth interfaces for input and/or output.

The display 260 includes a display screen component for presenting images, a driving component for driving image display, a component for receiving image signals output from a processor, a component for displaying video content, image content, and a menu control interface and a user control UI interface.

The display 260 can be a liquid crystal display, an OLED display, or a projection display, and can also be a projection device and a projection screen.

The communicator 220 is a component for communicating with an external device or a server according to various communication protocol types. For example, the communicator can include at least one of a WiFi module, a Bluetooth module, a wired Ethernet module, and other network communication protocol chips or near field communication protocol chips, and an infrared receiver. The display device can establish transmission and reception of control signals and data signals with the external control device 100 or the server 300 through the communicator 220.

The user interface can be used to receive control signals input from the user through the control device 100 (such as an infrared remote control, etc.) or touch or gesture.

The detector 230 is used to collect signals from the external environment or the external interaction. For example, the detector 230 includes a light receiver, a sensor for collecting the intensity of ambient light; or, the detector 230 includes an image collector, such as a camera, which can be used to collect external environment scenes, user attributes or user interaction gestures; or, the detector 230 includes a sound collector, such as a microphone, etc., for receiving external sounds.

The external device interface 240 can include, but is not limited to, any one or more of the following interfaces: a high-definition multimedia interface (HDMI), an analog or digital high-definition component input interface (component), a composite video input interface (CVBS), a USB input interface (USB), an RGB port, etc. The external device interface 240 can also be a composite input/output interface formed by the above multiple interfaces.

The tuner and demodulator 210 receives broadcast television signals via wired or wireless reception, and demodulates audio and video signals, such as EPG data signals, from a plurality of wireless or wired broadcast television signals.

In some embodiments, the processor 250 and the tuner and demodulator 210 can be located in different separate devices, that is, the tuner and demodulator 210 can also be located in an external device of the main device where the processor 250 is located, such as an external set-top box.

The processor 250 controls the operation of the display device and responds to user operations through various software control programs stored in the memory. The processor 250 controls the overall operation of the display device. For example, in response to receiving a user command for selecting a to-be-displayed UI object on the display 260, the processor 250 can perform operations related to the object selected by the user command.

In some embodiments, the processor includes at least one of a central processing unit (CPU), a video processor, an audio processor, a graphics processing unit (GPU), a random access memory (RAM), a read-only memory (ROM), a first interface to an nth interface for input and/or output, a communication bus (Bus), etc.

The user can input a user command through a graphical user interface (GUI) displayed on the display 260, and the user interface receives a user input command through the graphical user interface (GUI). Alternatively, the user can input a user command through a specific sound or gesture, and the user interface recognizes the sound or gesture through a sensor to receive the user input command.

"User interface" is a medium interface for interaction and information exchange between applications or operating systems and users, and realizes the conversion between the internal form of information and the form acceptable to users. The user interface can be the graphical user interface (GUI), which refers to the user interface related to computer operation displayed in a graphical way. It can be an interface element such as an icon, window, control, etc., displayed on the display screen of an electronic device, where the control can include interface elements that can be viewed, such as icons, buttons, menus, tabs, text boxes, dialog boxes, status bars, navigation bars, widgets, etc.

In some embodiments, the user interface 280 in the display device is configured to perform the following steps: receiving a selection operation from a user; the processor 250 is configured to, in response to the selection operation, determine one or more to-be-output captions from the captions of the to-be-played multimedia file; and obtain caption data of each to-be-output caption;

obtain a global clock of a playback pipeline of the to-be-played multimedia file and a synchronous rendering logic corresponding to each channel of to-be-output caption; based on the global clock and the synchronous rendering logic corresponding to each channel of to-be-output caption, synchronously render the caption data of each channel of to-be-output caption, so as to synchronously display each channel of to-be-output caption while playing the to-be-played multimedia file.

In some embodiments, the processor 250 can obtain the caption data of each to-be-output caption by: obtaining an encapsulated file corresponding to the to-be-played multimedia file; de-encapsulating the encapsulated file to obtain an elementary stream of the to-be-played multimedia file, wherein the elementary stream of the to-be-played multimedia file includes a caption elementary stream of at least one channel of caption; decoding a caption elementary stream of the to-be-output caption in the caption elementary stream of at least one channel of caption to obtain the caption data of the to-be-output caption.

In some embodiments, the user interface 140 of the control device 100 is further configured to perform the following steps: receiving a deletion operation from a user, wherein the deletion operation is used to stop synchronous display of a first caption in the to-be-output captions.

In some embodiments, the user interface 140 of the control device 100 is further configured to perform the following steps: receiving an adding operation from a user, wherein the adding operation is used to add synchronous display of a second caption other than the to-be-output captions.

In some embodiments, in some embodiments, the processor 250 can obtain the caption data of each channel of to-be-output caption by: obtaining at least one external caption file of the to-be-played multimedia file based on a native layer of a display device; de-encapsulating the at least one external caption file respectively to obtain a caption elementary stream corresponding to the at least one external caption file; decoding a caption elementary stream of the to-be-output caption in the caption elementary stream corresponding to the at least one external caption file to obtain the caption data of the to-be-output caption.

In some embodiments, the processor 250 can obtain the caption data of each channel of to-be-output caption by: obtaining at least one external caption file of the to-be-played multimedia file based on an application layer of a display device; and parsing the at least one external caption file to obtain caption data corresponding to each of the at least one external caption file.

In some embodiments, the processor 250 synchronously renders the caption data of each channel of to-be-output caption based on the global clock and the synchronous rendering logic corresponding to each channel of to-be-output caption, so as to synchronously display each channel of to-be-output caption while playing the to-be-played multimedia file, by: based on the global clock and a preset synchronous rendering logic, synchronously rendering the caption data of each channel of to-be-output caption, so as to synchronously display each channel of to-be-output caption while playing the to-be-played multimedia file.

In some embodiments, the processor 250 is further configured to add identification information of a target caption in a rendering event corresponding to the target caption; wherein the target caption is any one channel of to-be-output caption in the one or more channels of to-be-output captions, and the identification information is used to uniquely identify the target caption.

In some embodiments, the processor 250 can obtain the global clock of the playback pipeline of the to-be-played multimedia file, by: obtaining an audio clock of the to-be-played multimedia file; and determining the audio clock as the global clock of the playback pipeline of the to-be-played multimedia file.

In some embodiments, the user interface 280 is further configured for: receiving a deletion operation from a user, wherein the deletion operation is used to stop synchronous display of a first caption in the to-be-output captions; the processor 250 is further configured for: in response to the deletion operation from the user, stopping synchronously rendering the first caption to stop synchronously display of the first caption while playing the to-be-played multimedia file.

In some embodiments, the user interface 280 is further configured for: receiving an adding operation from a user, wherein the adding operation is used to add synchronous display of a second caption other than the to-be-output captions; the processor 250 is further configured for: obtaining caption data of the second caption and a synchronous rendering logic corresponding to the second caption, and synchronously rendering the caption data of the second caption according to the global clock and the synchronous rendering logic corresponding to the second caption to add synchronous display of the second caption.

Figure 13:
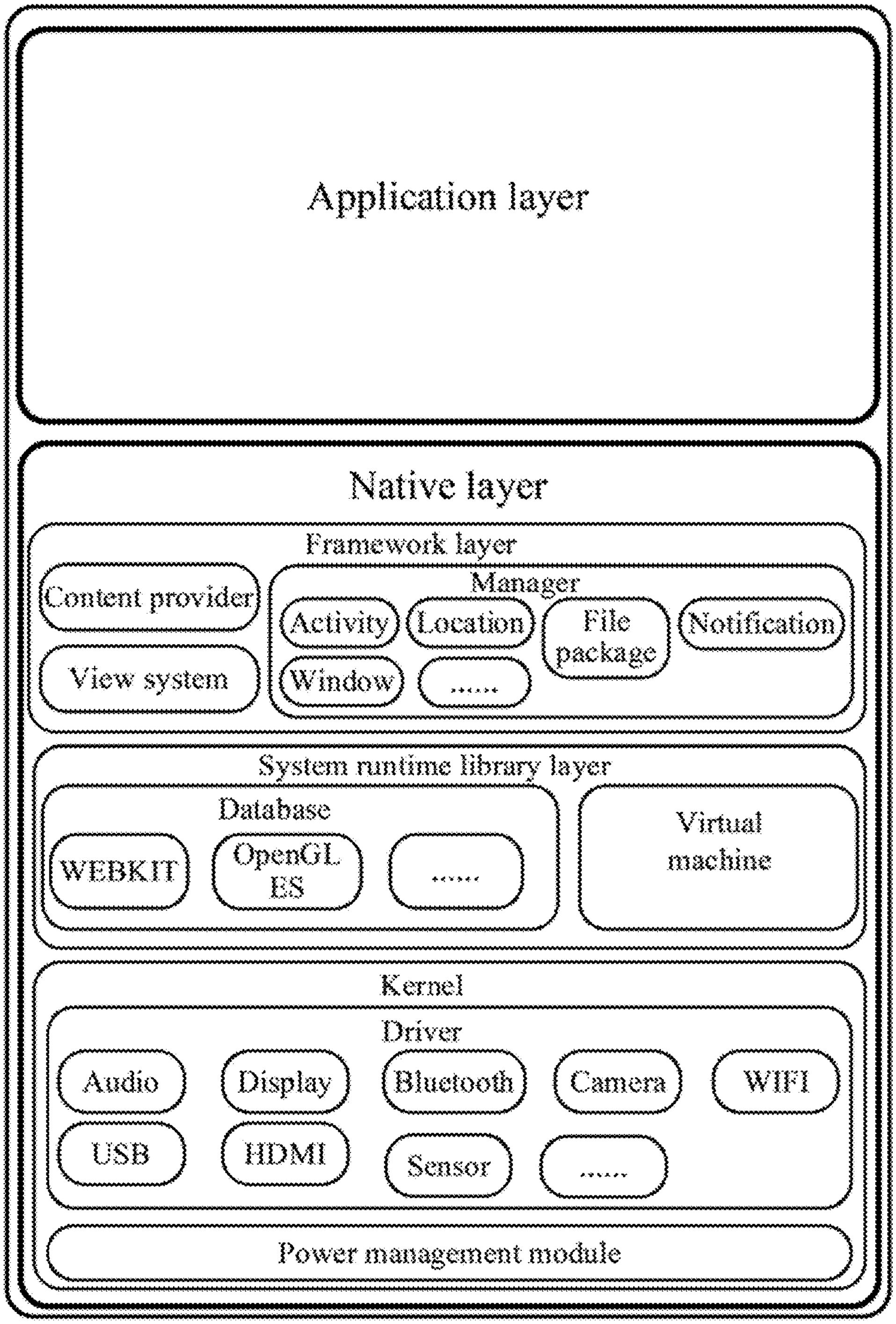
FIG. 13 is a diagram of software configuration in a display device according to some embodiments.

FIG. 13 is a software configuration diagram in a display device according to some embodiments. Referring to FIGS. 2 and 13, in some embodiments, the operating system of the display device is divided into two parts, an application layer and a native layer. The application layer is an application (Applications) layer (referred to as the "application layer"), and the native layer is, from top to bottom, a native application framework (Application Framework) layer (referred to as the "framework layer"), an Android runtime (Android runtime) and system library layer (referred to as the "system runtime library layer"), and a kernel layer.

As shown in FIG. 13, the application framework layer in the embodiments of the present disclosure includes managers, content providers, etc., where the manager includes at least one of the following modules: an activity manager for interacting with all activities running in the system; a location manager for providing system services or applications with access to system location services; a package manager for retrieving various information related to applications currently installed on the device; a notification manager for controlling the display and clearing of notification messages; and a window manager for managing icons, windows, toolbars, wallpapers, and desktop widgets on the user interface.

In some embodiments, the activity manager is used to manage the life cycle of each application and the common navigation back function, such as controlling the exit, opening, and back of the application. The window manager is used to manage all window programs, such as obtaining the display screen size, determining whether there is a status bar, locking the screen, capturing the screen, and controlling the display window changes (for example, reducing the display window, shaking the display, distorting the display, etc.).

Figure 14:
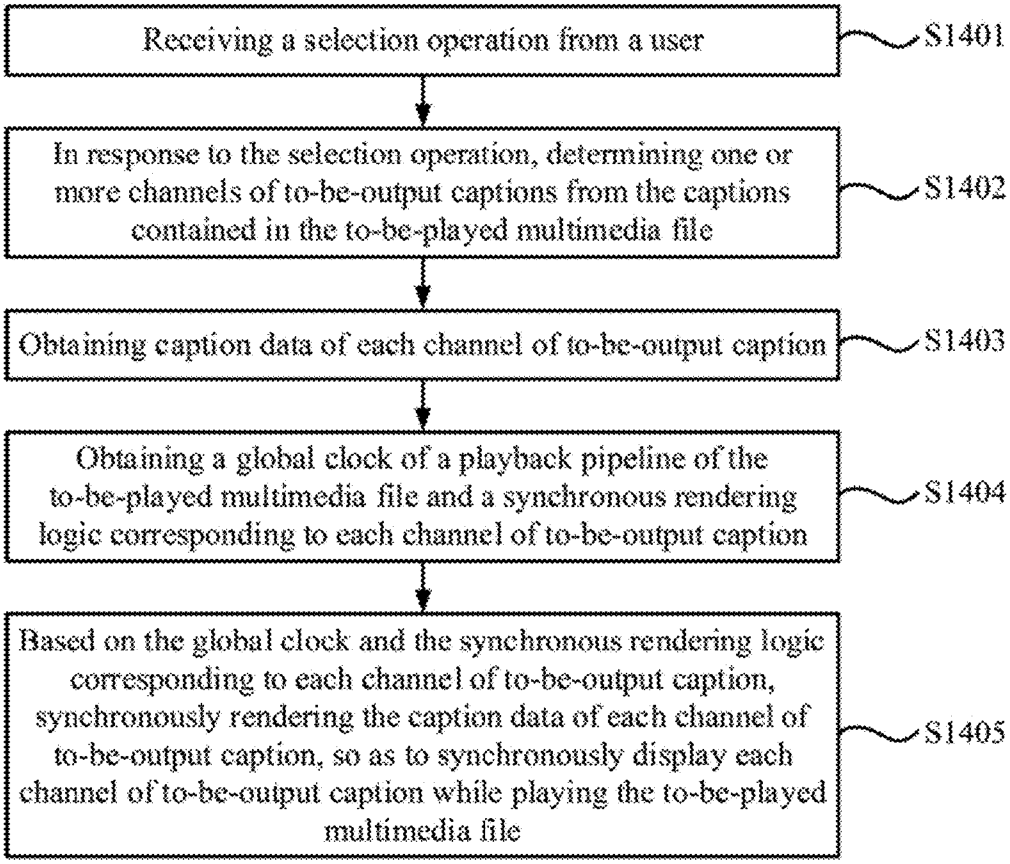
FIG. 14 is a flowchart of steps of a caption display method according to some embodiments.

FIG. 14 is a flow chart of a caption display method according to some embodiments. As shown in FIG. 14, the caption display method provided by the embodiments of the present disclosure includes the following steps.

S1401, receiving a selection operation from a user.

In some embodiments, an object for receiving the selection operation from the user can be any display device capable of playing audio and video, such as a television, a mobile phone, etc.; the implementation method for receiving the selection operation from the user can be: when the display device is a television, the user selects captions through a remote control, and the television receives a selection signal from the remote control through a communication interface; when the display device is a mobile phone, the user selects captions to be output through a caption selection interface, and the communication interface in the mobile phone receives a selection signal.

S1402, in response to the selection operation, determining one or more channels of to-be-output captions from the captions contained in the to-be-played multimedia file.

In some embodiments, the to-be-played multimedia file can be a multimedia file stored locally on the display device, or can be a multimedia file downloaded from the network by the display device, for example, a multimedia file provided by video playback software on the display device; exemplarily, the multimedia file can include a video file, an audio file, and a caption file, the audio file includes at least one channel of audio channel, and the caption file includes at least one channel of caption. Exemplarily, the to-be-output caption can be a text caption or a picture caption.

The caption file included in the multimedia file is called an embedded caption file.

S1403, obtaining caption data of each channel of to-be-output caption.

In some embodiments, the obtaining of the caption data of each channel of to-be-output caption can be performed by de-encapsulating and decoding the caption file of each channel of to-be-output caption; or by parsing and obtaining the caption file of each channel of to-be-output caption.

S1404, obtaining a global clock of a playback pipeline of the to-be-played multimedia file and a synchronous rendering logic corresponding to each channel of to-be-output caption.

The method for obtaining the global clock of the playback pipeline of the to-be-played multimedia file includes the following steps 1 and 2:

Step 1: obtaining an audio clock of the to-be-played multimedia file.

In some embodiments, the audio clock of the to-be-played multimedia file is carried by an audio stream in the multimedia file, and the audio stream is decoded to obtain the audio clock.

Step 2: determining the audio clock as the global clock of the playback pipeline of the to-be-played multimedia file.

In some embodiments, the global clock provides a monotonically increasing absolute time, that is, the current time of the audio and video playback of the multimedia file, and the display period of each channel of to-be-output caption can be determined by the global clock.

S1405, based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

In the above S1405, the synchronously rendering caption data of each channel of to-be-output caption further includes:

adding identification information of the target caption a rendering event corresponding to the target caption.

The target caption is any one of the one or more channels of to-be-output captions, and the identification information is used to uniquely identify the target caption.

In some embodiments, it is necessary to determine the identification information corresponding to the target caption according to the current rendering event, and then perform synchronous rendering and broadcast. Exemplarily, when synchronously rendering the target captions, the global clock can be obtained through the playback pipeline, and the running time of rendering the target captions can be obtained. By comparing the difference between the display time of rendering the target captions and the running time, synchronization processing can be performed. If the cumulative sum of the display time of the currently transmitted target captions and the frame display time is within a certain threshold range of the current running time, the target captions are rendered. If it arrives ahead of time, wait, otherwise the frame data is discarded.

Figure 15:
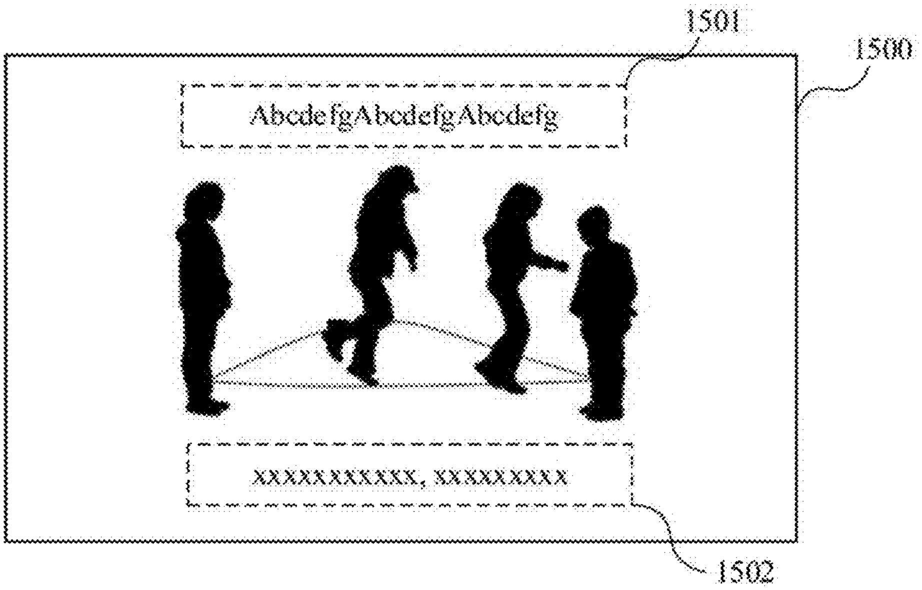
FIG. 15 is a schematic diagram of a scenario of a caption display method according to some embodiments.

Exemplarily, as shown in FIG. 15, FIG. 15 is a scene diagram of a caption display method according to some embodiments. When the user selects 2 channels of to-be-displayed captions on a display device, the scene includes: a display screen 1500 of the display device, a display area 1501 of a caption 1, and a display area 1502 of a caption 2. Specifically, the user can also set the area where the captions are displayed, as well as the font style, font size, and color of the captions.

It can be seen from the above embodiments of the present disclosure, a selection operation can be received through a user interface; the processor determines one or more channels of to-be-output captions from the captions of the to-be-played multimedia file in response to the selection operation; then obtains caption data of each channel of to-be-output caption; then obtains the global clock of the playback pipeline of the to-be-played multimedia file and the synchronous rendering logic corresponding to each channel of to-be-output caption; finally, based on the global clock and the synchronous rendering logic corresponding to each channel of to-be-output caption, the caption data of each channel of to-be-output caption is synchronously rendered, so that each channel of to-be-output caption is synchronously displayed while playing the multimedia file. Compared with the related art, only one caption can be displayed on the display device. The present disclosure can obtain the global clock of the to-be-played multimedia file, combined with the synchronous rendering logic of each channel of to-be-output caption, so that at least one channel of to-be-output caption can be played synchronously with the audio and video. Therefore, the embodiments of the present disclosure can display at least one channel of to-be-output caption on the display device, thereby improving the user experience.

Figure 16:
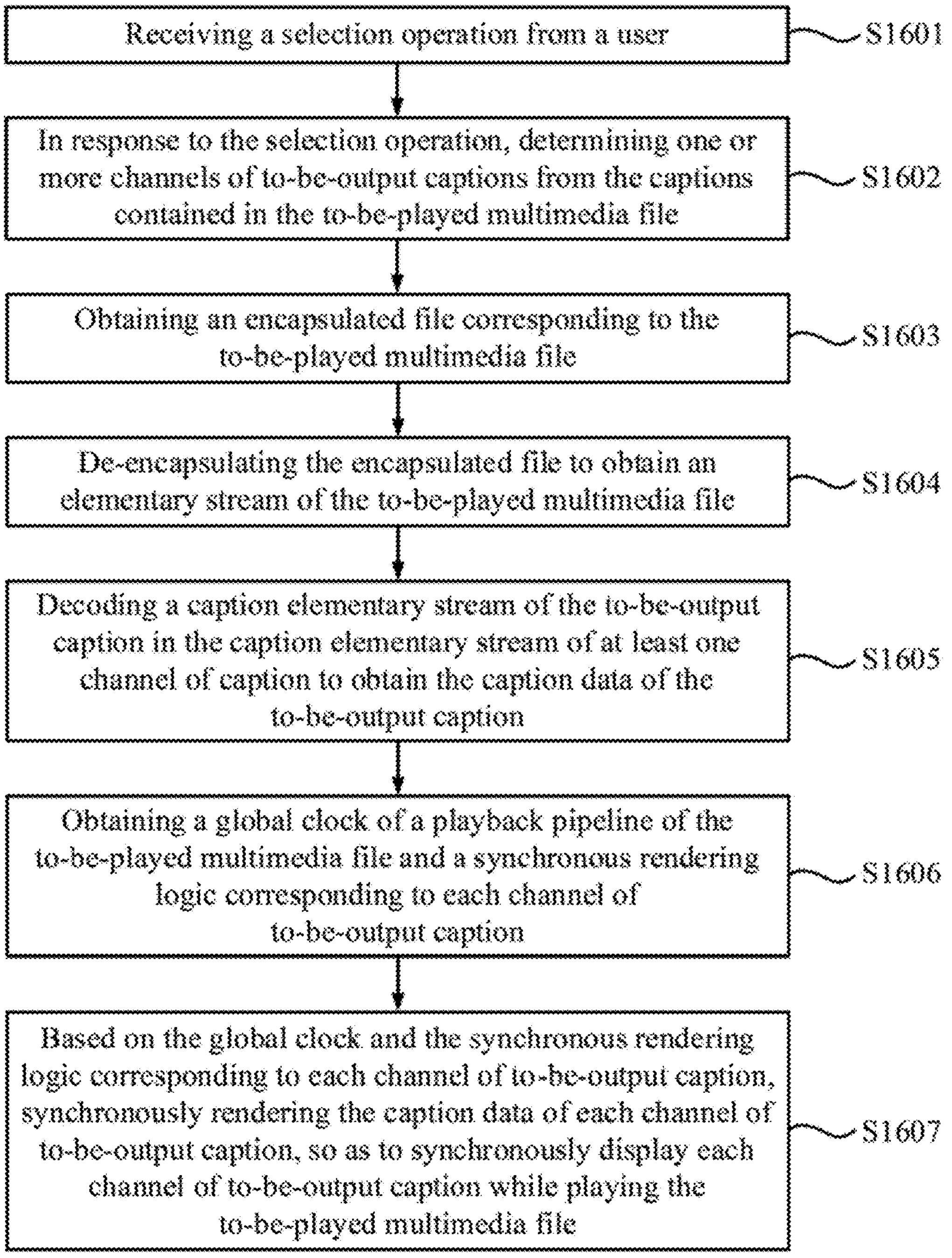
FIG. 16 is a flowchart of steps of a caption display method according to some embodiments.

FIG. 16 is a flow chart of a caption display method according to some embodiments. As shown in FIG. 16, the caption display method provided by the embodiment of the present disclosure includes the following steps.

S1601, receiving a selection operation from a user.

S1602, in response to the selection operation, determining one or more channels of to-be-output captions from the captions contained in the to-be-played multimedia file.

S1603, obtaining an encapsulated file corresponding to the to-be-played multimedia file.

In some embodiments, multimedia files are divided into streaming media files and non-streaming media files. For streaming media files, obtaining the encapsulated file corresponding to the to-be-played multimedia file is performed by parsing the streaming media file protocol to obtain the media segment address and downloading the encapsulated file. For non-streaming media files, the encapsulated file can be directly obtained.

S1604, de-encapsulating the encapsulated file to obtain an elementary stream of the to-be-played multimedia file.

The elementary stream of the to-be-played multimedia file includes a caption elementary stream of at least one channel of caption.

In some embodiments, the elementary stream of the to-be-played multimedia file further includes: a video stream and at least one channel of audio stream.

S1605, decoding a caption elementary stream of the to-be-output caption in the caption elementary stream of at least one channel of caption to obtain the caption data of the to-be-output caption.

In some embodiments, the caption data of the to-be-output caption includes: text content, display duration and display timestamp of text caption data; or a bitmap, display duration and display timestamp of picture caption data.

S1606, obtaining a global clock of a playback pipeline of the to-be-played multimedia file and a synchronous rendering logic corresponding to each channel of to-be-output caption.

S1607: based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

Figure 17:
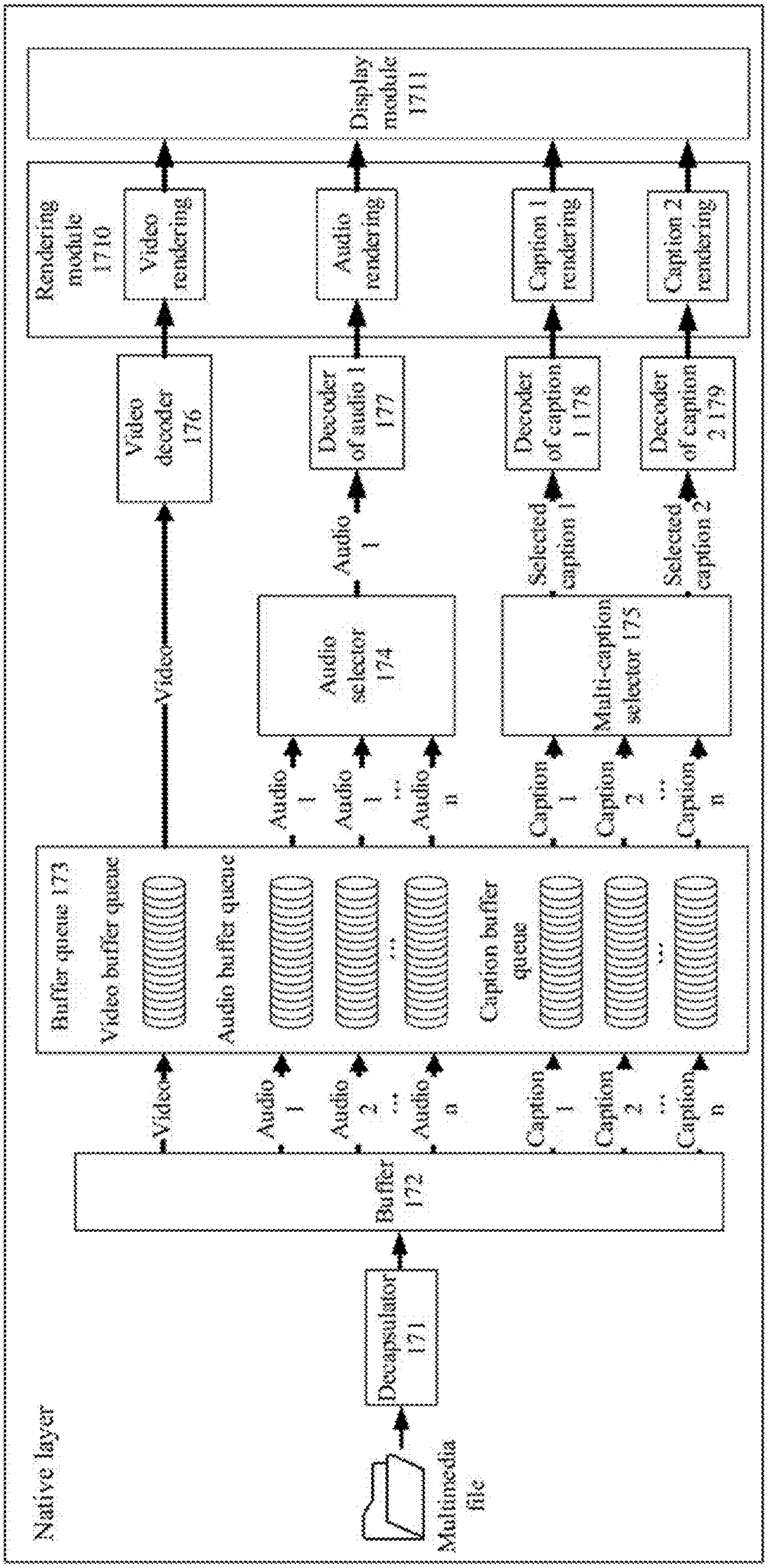
FIG. 17 is a schematic diagram of a caption display method according to some embodiments.

Exemplarily, based on the embodiment described in FIG. 16 above, referring to FIG. 17, FIG. 17 is a schematic diagram of a caption display method according to some embodiments. Specifically, FIG. 17 is a schematic diagram of a scenario for implementing a multi-caption display method based on the player architecture shown in FIG. 10. The multimedia files in the scenario include: video files, audio files, and caption files. The scenario includes:

- a decapsulator 171, used to decapsulate the multimedia file to obtain the corresponding video stream, at least one channel of audio stream and at least one channel of caption stream;
- a buffer 172, used to buffer the video stream, at least one channel of audio stream and at least one channel of caption stream obtained after being decapsulated by the decapsulator 171;
- a buffer queue 173, used to buffer the video stream, at least one channel of audio stream and at least one channel of caption stream;
- an audio-video selector 174, used to select one channel of audio from at least one channel of audio;
- a multi-caption selector 175, used to select a target caption according to identification information of the target caption added in a rendering event.

Exemplarily, the target captions are caption 1 and caption 2.

A video decoder 176 is used to decode a video elementary stream to obtain video data.

A decoder 177 of an audio 1 is used to decode one channel of audio selected by the audio-video selector 174 to obtain audio data.

A decoder 178 of a caption 1 is used to decode an elementary stream of the caption 1 to obtain data of the caption 1.

A decoder 179 of a caption 2 is used to decode an elementary stream of the caption 2 to obtain data of the caption 1.

A rendering module 1710 is used to synchronously render the video data, audio data, data of the caption 1 and data of caption 2.

A display module 1711 is used to play audio, display video, caption 1, and caption 2 on a display device.

Figure 18:
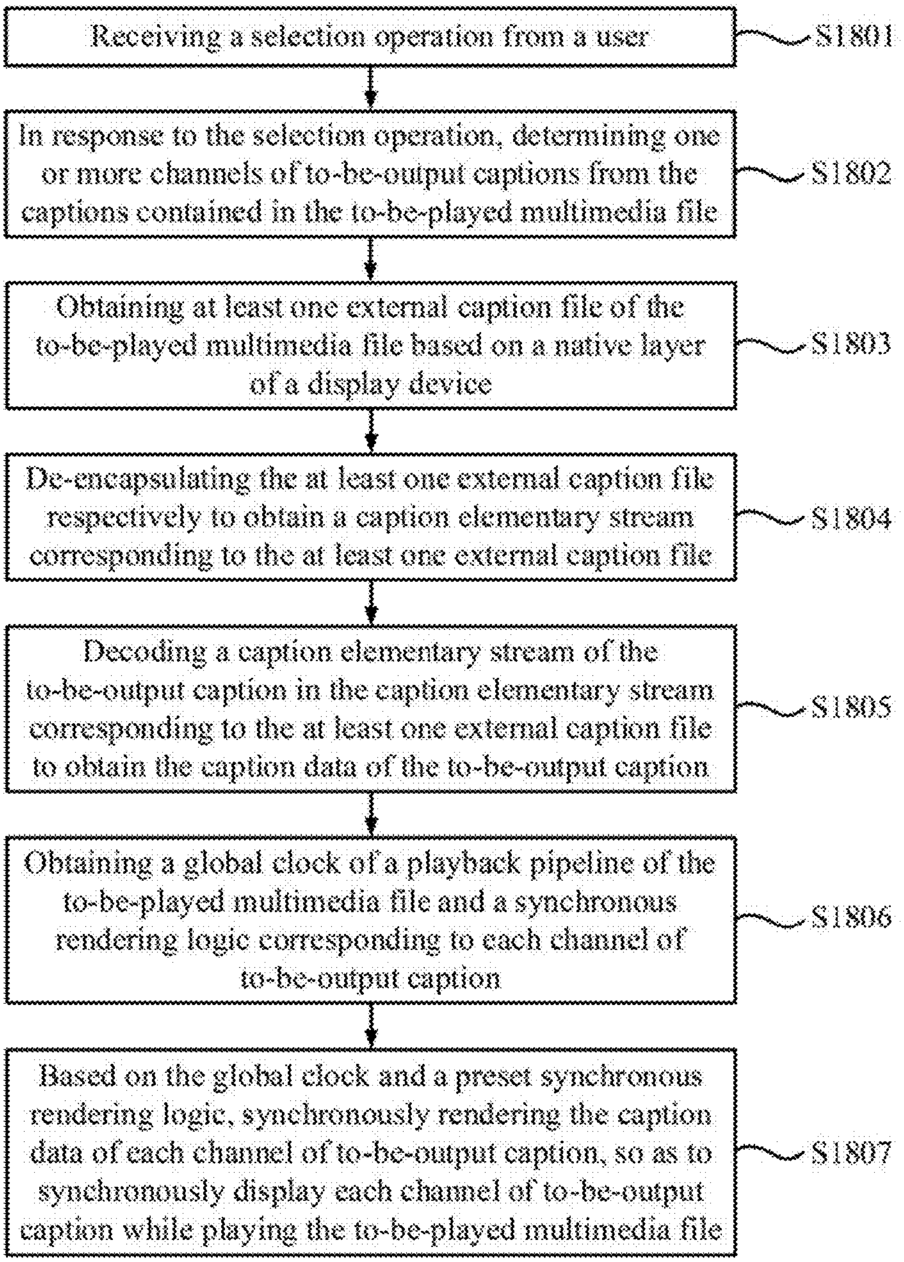
FIG. 18 is a flowchart of another caption display method according to some embodiments.

FIG. 18 is a flowchart of another caption display method according to some embodiments. As shown in FIG. 18, the caption display method provided by the embodiment of the present disclosure includes the following steps.

S1801, receiving a selection operation from a user.

S1802, in response to the selection operation, determining one or more channels of to-be-output captions from the captions contained in the to-be-played multimedia file.

S1803, obtaining at least one external caption file of the to-be-played multimedia file based on a native layer of a display device.

In some embodiments, the native layer of the display device is a development environment based on the C++ language.

S1804, de-encapsulating the at least one external caption file respectively to obtain a caption elementary stream corresponding to the at least one external caption file.

S1805, decoding a caption elementary stream of the to-be-output caption in the caption elementary stream corresponding to the at least one external caption file to obtain the caption data of the to-be-output caption.

S1806, obtaining a global clock of a playback pipeline of the to-be-played multimedia file and a synchronous rendering logic corresponding to each channel of to-be-output caption.

S1807, based on the global clock and a preset synchronous rendering logic, synchronously rendering the caption data of each channel of to-be-output caption, so as to synchronously display each channel of to-be-output caption while playing the to-be-played multimedia file.

Figure 19:
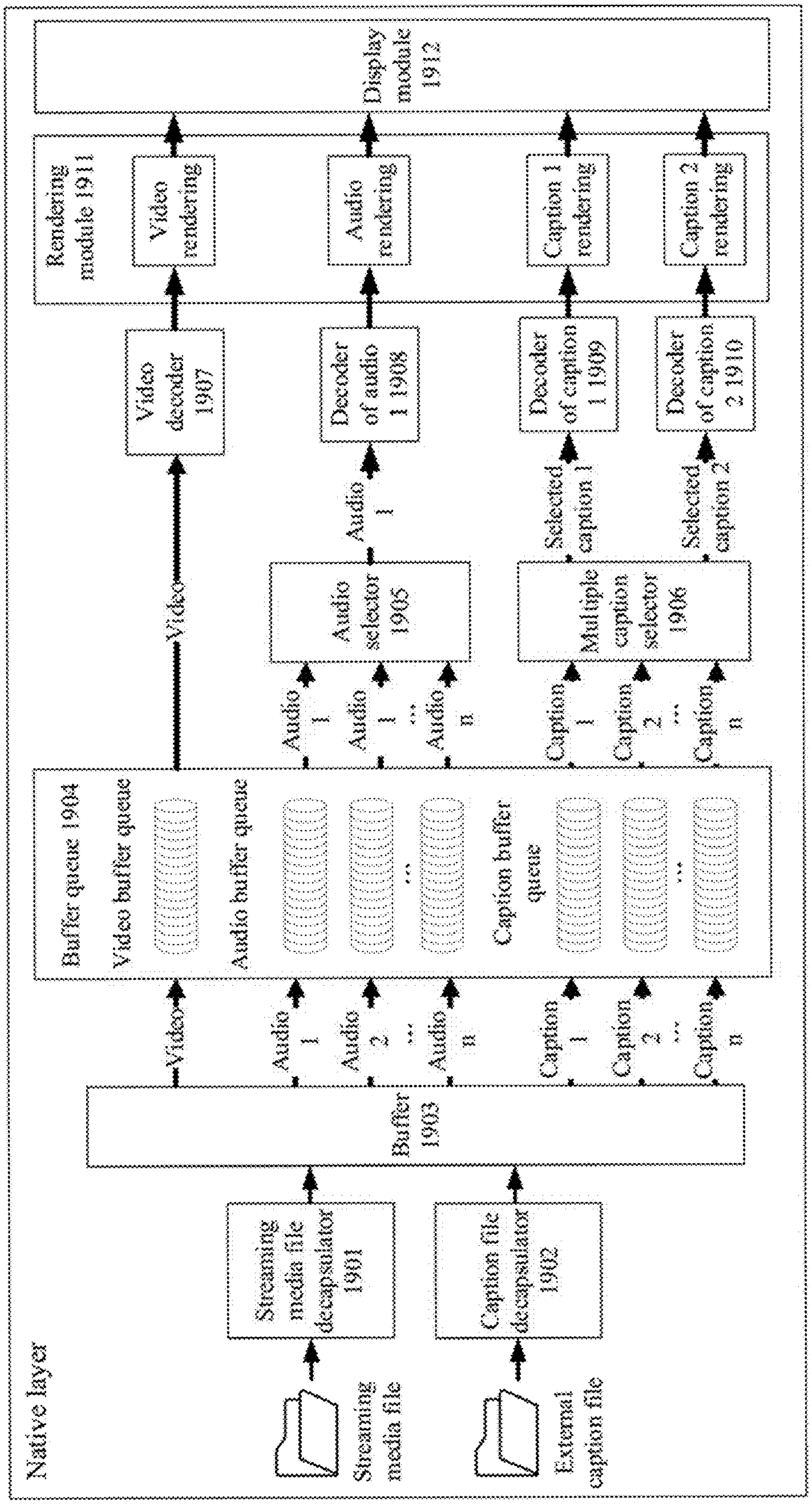
FIG. 19 is a schematic diagram of another caption display method according to some embodiments.

Exemplarily, in combination with the embodiment described in FIG. 18, referring to FIG. 19, FIG. 19 is a schematic diagram of another caption display method according to some embodiments. Specifically, FIG. 19 is a schematic diagram of a scenario for implementing a multi-caption display method based on the player architecture shown in FIG. 10. The streaming media file in the scenario includes a video file and an audio file. The scenario includes the following.

A streaming media file decapsulator 1901 is used to decapsulate a streaming media file to obtain a corresponding video stream and at least one channel of audio stream.

A caption file decapsulator 1902 is used to decapsulate an external caption file to obtain at least one channel of corresponding caption stream.

A buffer 1903 is used to buffer a decapsulated video stream, at least one channel of audio stream and at least one channel of caption stream.

A buffer queue 1904 is used to buffer a video stream, at least one channel of audio stream and at least one channel of caption stream.

An audio/video selector 1905 is used to select one channel of audio from at least one channel of audio.

A multiple caption selector 1906 is used to select target captions according to identification information of the target captions added in a rendering event.

Exemplarily, the target captions are caption 1 and caption 2.

A video decoder 1907 is used to decode a video elementary stream to obtain video data.

A decoder 1908 of an audio 1 is used to decode one channel of audio selected by the audio-video selector 84 to obtain audio data.

A decoder 1909 of a caption 1 is used to decode an elementary stream of the caption 1 to obtain data of the caption 1.

A decoder 1910 of a caption 2 is used to decode an elementary stream of the caption 2 to obtain data of the caption 1.

A rendering module 1911 is used for synchronously rendering the video data, the audio data, the data of the caption 1 and the data of the caption 2.

A display module 1912 is used to play audio, display video, caption 1, and caption 2 on a display device.

In the above embodiments, for each channel of to-be-output caption file, in the native layer of the display device, by obtaining at least one external caption file of the to-be-played multimedia file in the native layer of the display device, the at least one external caption file is respectively de-encapsulated, a caption elementary stream corresponding to the at least one external caption file is obtained, and the caption elementary stream of the to-be-output caption in the caption elementary stream corresponding to the at least one external caption file is decoded to obtain caption data of the to-be-output caption.

Then, based on the global clock and the preset synchronous rendering logic, the caption data of each channel of the to-be-output captions is synchronously rendered, so that each channel of the to-be-output captions is synchronously displayed when the multimedia file is played, so as to display at least one channel of caption on the display device and improve the user experience.

Figure 20:
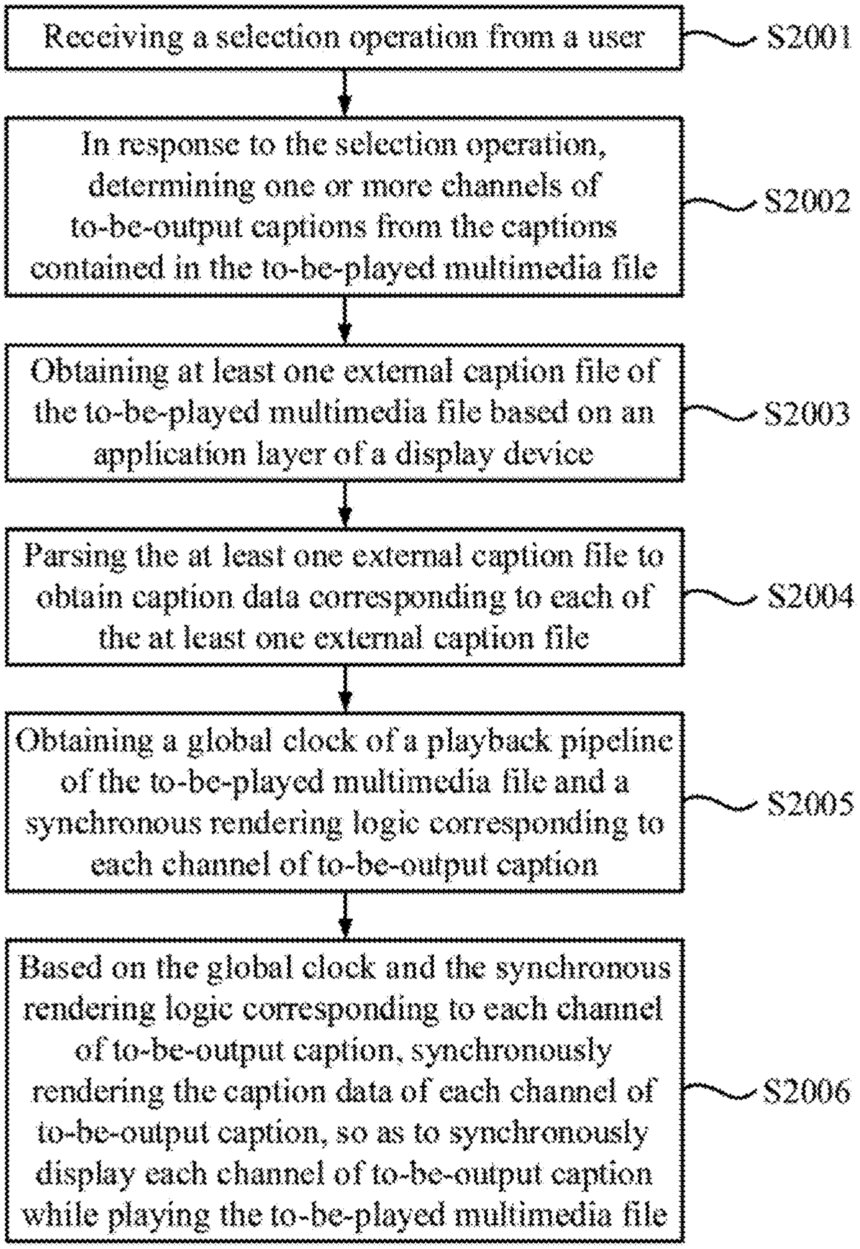
FIG. 20 is a flowchart of another caption display method according to some embodiments.

FIG. 20 is a flowchart of another caption display method according to some embodiments. As shown in FIG. 20, the caption display method provided by the embodiment of the present disclosure includes the following steps.

S2001, receiving a selection operation from a user.

S2002, in response to the selection operation, determining one or more channels of to-be-output captions from the captions contained in the to-be-played multimedia file.

S2003, obtaining at least one external caption file of the to-be-played multimedia file based on an application layer of a display device.

In some embodiments, the application layer of the display device is a development environment based on the JAVE language.

S2004, parsing the at least one external caption file to obtain caption data corresponding to each of the at least one external caption file.

S2005, obtaining a global clock of a playback pipeline of the to-be-played multimedia file and a synchronous rendering logic corresponding to each channel of to-be-output caption.

S2006, based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

Figure 21:
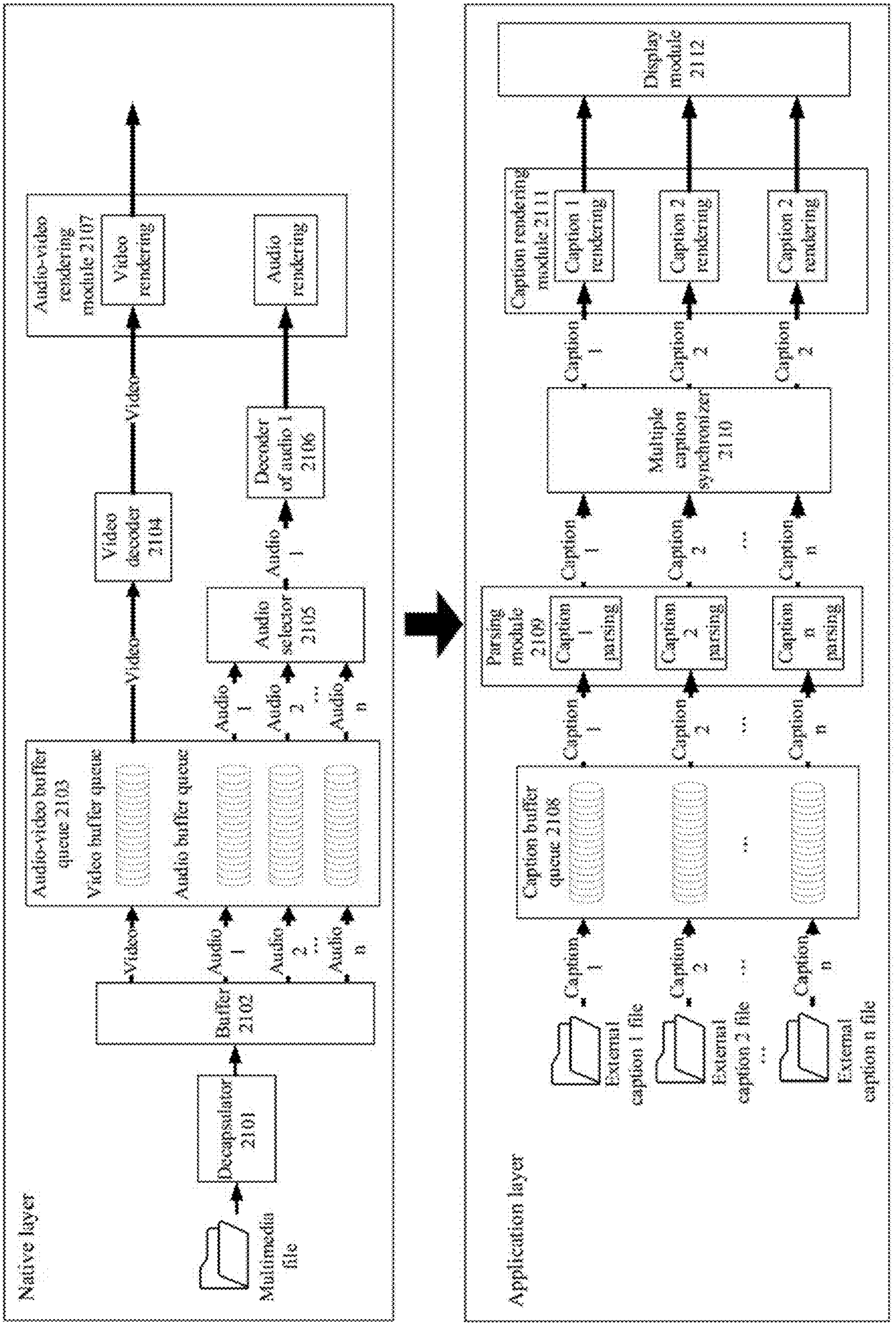
FIG. 21 is a schematic diagram of yet another caption display method according to some embodiments.

Exemplarily, in combination with the embodiment described in FIG. 20, referring to FIG. 21, FIG. 21 is a schematic diagram of another caption display method according to some embodiments. Specifically, FIG. 21 is a schematic diagram of a scenario for implementing a multi-caption display method based on the player architecture shown in FIG. 10. In this scenario, the to-be-output captions are two channels of captions, i.e., caption 1 and caption 2, and the caption files containing caption 1 and caption 2 are in the external caption files of the application layer. The scenario includes:

a method for obtaining video and audio can be referred to the description of the embodiment shown in FIG. 17, which will not be repeated here.

A caption buffer queue 2108 is used to perform buffering processing on at least one external caption file.

A parsing module 2109 is used to parse at least one external caption file to obtain caption data corresponding to each external caption file.

A multi-caption synchronizer 2110 is used to obtain a global clock of a playback pipeline of the to-be-played multimedia file and a synchronization rendering logic corresponding to each channel of to-be-output caption.

A caption rendering module 2111 is used to synchronously render caption data of each channel of to-be-output caption based on the global clock and the synchronous rendering logic corresponding to each channel of to-be-output caption, so as to synchronously display each channel of to-be-output caption while playing the multimedia file.

A display module 2112 is used to select caption 1 and caption 2 for rendering and display according to identification information of a target caption added in a rendering event corresponding to the target caption.

In the above embodiment, for each channel of to-be-output caption, in the application layer of the display device, at least one external caption file of the to-be-played multimedia file is obtained by acquiring the application layer of the display device, and the at least one external caption file is parsed to obtain caption data corresponding to each external caption file, and then the global clock of the playback pipeline of the to-be-played multimedia file and the synchronous rendering logic corresponding to each channel of to-be-output caption are obtained, and then the caption data of each channel of to-be-output caption are synchronously rendered, so that each channel of to-be-output caption is synchronously displayed when the multimedia file is played, so as to display at least one channel of caption on the display device and improve the user experience.

Figure 22:
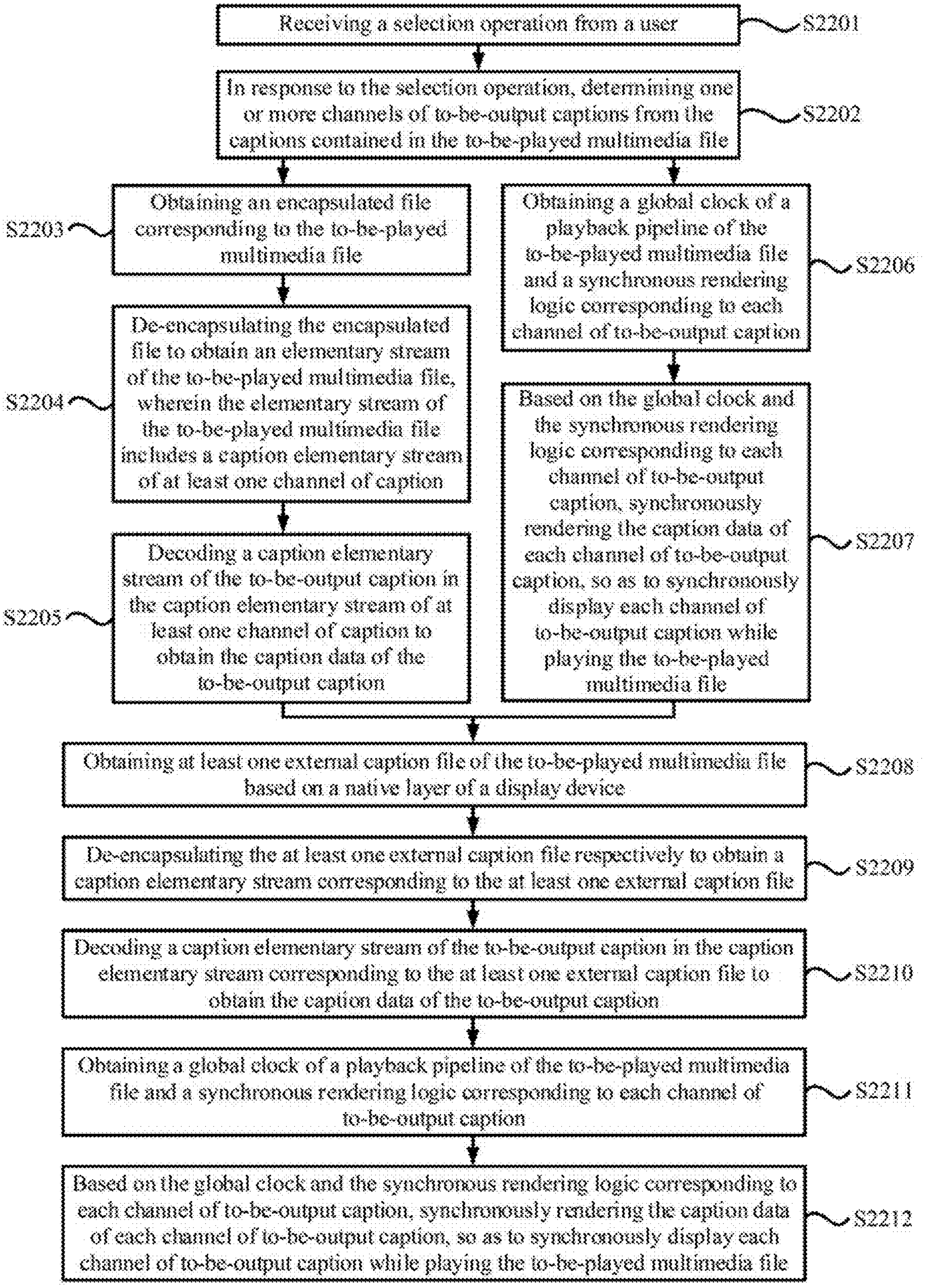
FIG. 22 is a flowchart of another caption display method according to some embodiments.

FIG. 22 is a flowchart of another caption display method according to some embodiments. As shown in FIG. 22, the caption display method provided by the embodiment of the present disclosure includes the following steps.

S2201, receiving a selection operation from a user.

S2202, in response to the selection operation, determining one or more channels of to-be-output captions from the captions contained in the to-be-played multimedia file.

S2203, obtaining an encapsulated file corresponding to the to-be-played multimedia file.

S2204, de-encapsulating the encapsulated file to obtain an elementary stream of the to-be-played multimedia file, wherein the elementary stream of the to-be-played multimedia file includes a caption elementary stream of at least one channel of caption.

S2205, decoding a caption elementary stream of the to-be-output caption in the caption elementary stream of at least one channel of caption to obtain the caption data of the to-be-output caption.

S2206, obtaining a global clock of a playback pipeline of the to-be-played multimedia file and a synchronous rendering logic corresponding to each channel of to-be-output caption.

S2207, based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

While executing the above S2203-S2207, the embodiment of the present disclosure also executes the following S2208-S2212.

S2208, obtaining at least one external caption file of the to-be-played multimedia file based on a native layer of a display device.

S2209, de-encapsulating the at least one external caption file respectively to obtain a caption elementary stream corresponding to the at least one external caption file.

S2210, decoding a caption elementary stream of the to-be-output caption in the caption elementary stream corresponding to the at least one external caption file to obtain the caption data of the to-be-output caption.

S2211, obtaining a global clock of a playback pipeline of the to-be-played multimedia file and a synchronous rendering logic corresponding to each channel of to-be-output caption.

S2212, based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

Figure 23:
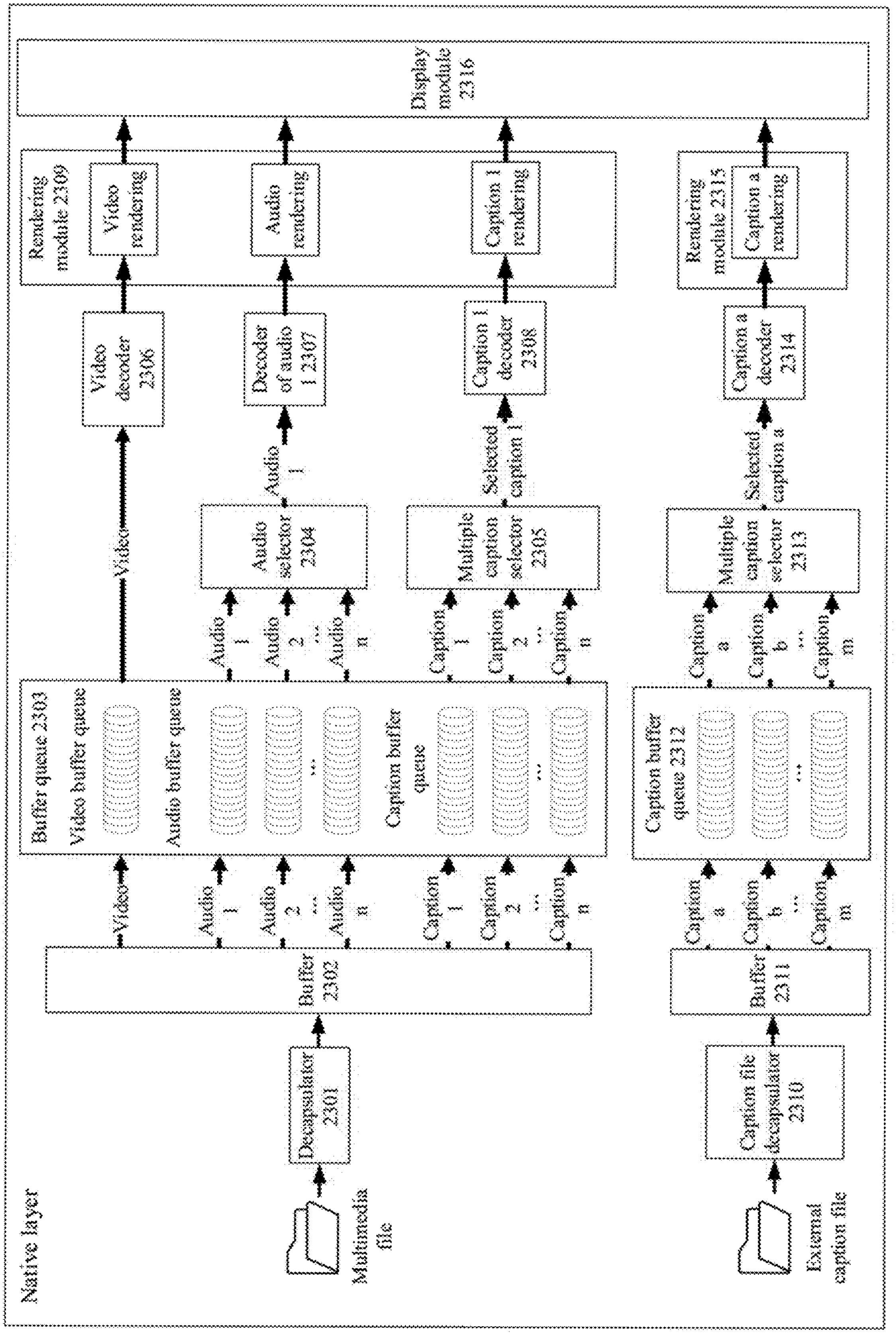
FIG. 23 is a schematic diagram of yet another caption display method according to some embodiments.

Exemplarily, in combination with the embodiment described in FIG. 22 above, referring to FIG. 23, FIG. 23 is a schematic diagram of another caption display method according to some embodiments. Specifically, FIG. 23 is a scene schematic diagram of a multi-caption display method based on the player architecture shown in FIG. 10, wherein the to-be-output captions are two channels of captions: caption 1 and caption a. The caption file containing caption 1 is in the multimedia file of the native layer, and the caption file containing caption a is in the external caption file of the native layer. The method for obtaining caption 1 in the native layer can refer to the description of the scene schematic diagram of the embodiment shown in FIG. 17, and the method for obtaining caption a in the native layer can refer to FIG. 19, which will not be repeated here.

Figure 24:
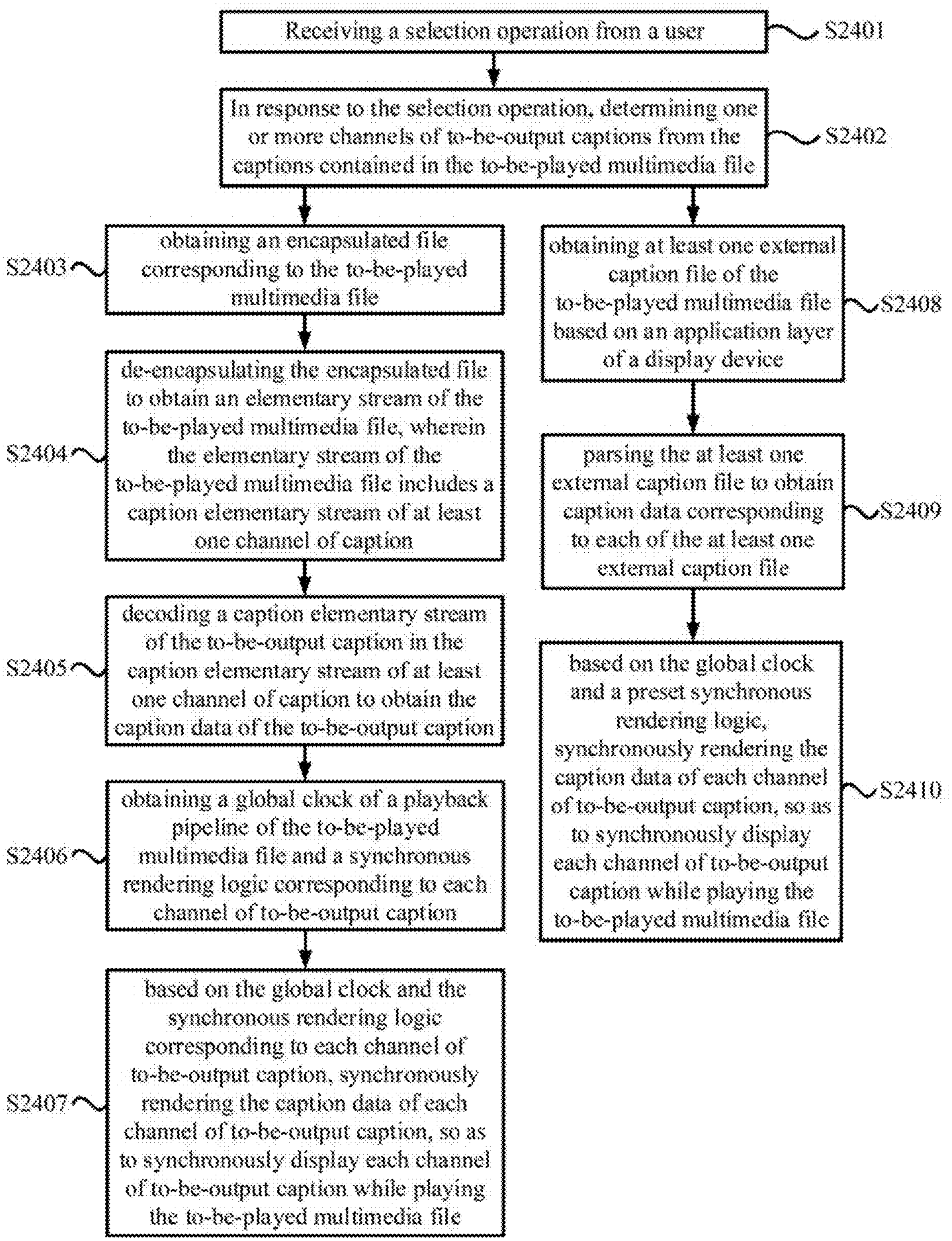
FIG. 24 is a flowchart of another caption display method according to some embodiments.

FIG. 24 is a flowchart of another caption display method according to some embodiments. As shown in FIG. 24, the caption display method provided by the embodiment of the present disclosure includes the following steps.

S2401, receiving a selection operation from a user.

S2402, in response to the selection operation, determining one or more channels of to-be-output captions from the captions contained in the to-be-played multimedia file.

S2403, obtaining an encapsulated file corresponding to the to-be-played multimedia file.

S2404, de-encapsulating the encapsulated file to obtain an elementary stream of the to-be-played multimedia file, wherein the elementary stream of the to-be-played multimedia file includes a caption elementary stream of at least one channel of caption.

S2405, decoding a caption elementary stream of the to-be-output caption in the caption elementary stream of at least one channel of caption to obtain the caption data of the to-be-output caption.

S2406, obtaining a global clock of a playback pipeline of the to-be-played multimedia file and a synchronous rendering logic corresponding to each channel of to-be-output caption.

S2407, based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

While executing the above S2403-S2407, the embodiment of the present disclosure also executes the following S2408-S2410.

S2408, obtaining at least one external caption file of the to-be-played multimedia file based on an application layer of a display device.

S2409, parsing the at least one external caption file to obtain caption data corresponding to each of the at least one external caption file.

S2410, based on the global clock and a preset synchronous rendering logic, synchronously rendering the caption data of each channel of to-be-output caption, so as to synchronously display each channel of to-be-output caption while playing the to-be-played multimedia file.

Figure 25:
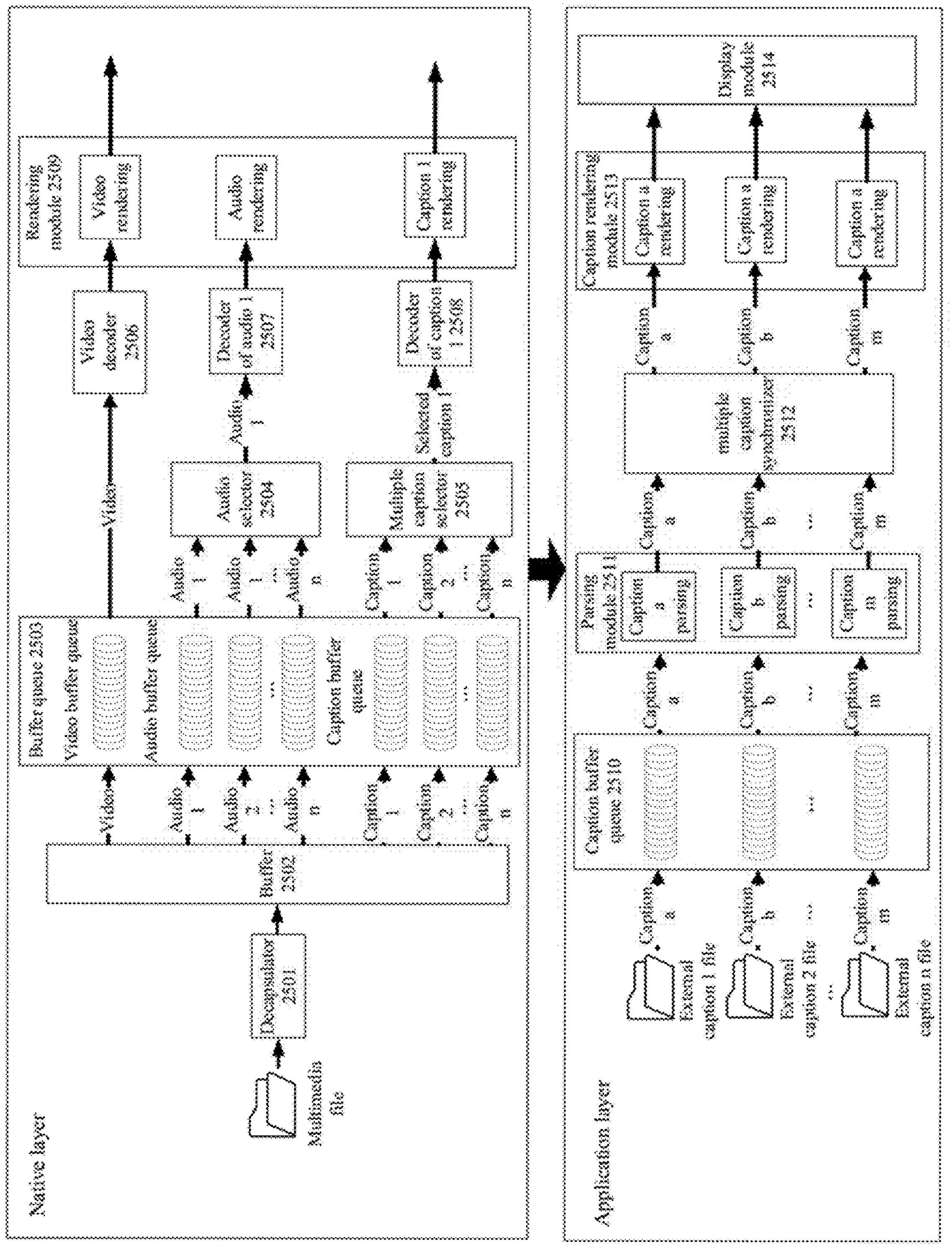
FIG. 25 is a schematic diagram of yet another caption display method according to some embodiments.

Exemplarily, in combination with the embodiment described in FIG. 24 above, refer to FIG. 25, FIG. 25 is a schematic diagram of another caption display method according to some embodiments. Specifically, FIG. 25 is a scene schematic diagram of a multi-caption display method based on the player architecture shown in FIG. 10, and the to-be-output captions are two channels of captions: caption 1 and caption a. The caption file containing caption 1 is in the multimedia file of the native layer, and the caption file containing caption a is in the external caption file of the application layer. The method for the native layer to obtain caption 1 can refer to the description of the scene schematic diagram of the embodiment shown in FIG. 17, and then the rendered video and caption 1 are transmitted to the application layer, and then displayed on the display device synchronously with caption a. The method for the application layer to obtain caption a can refer to the description of the scene schematic diagram of the embodiment shown in FIG. 21, which will not be repeated here.

Figure 26:
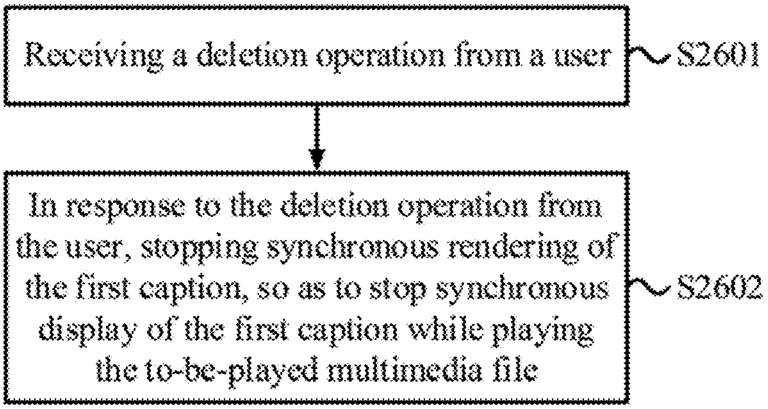
FIG. 26 is a flowchart of another caption display method according to some embodiments.

As an extension and refinement of the above embodiment, as shown in FIG. 26, the caption display method provided in the embodiment of the present disclosure further includes the following S2601 and S2602.

S2601, receiving a deletion operation from a user.

The deleting operation is used to stop the synchronous display of the first caption in the to-be-output captions.

For example, captions 1 and captions 2 are currently being displayed on the current display device. When the first caption is caption 1, the user does not need to display caption 2, or wants to switch caption 2 to caption 3. The user can delete caption 1 through the remote control of the display device or the touch button of the user interface.

Since the caption synchronization rendering module does not provide a clock, the caption decoding module and rendering module can be dynamically added and removed. If the user selects other captions during playback, the data in each caption decoding module and caption synchronization rendering module is directly cleared, and these modules are removed. Based on the new output elementary stream of the multi-caption selector, the corresponding caption decoding module and caption synchronization rendering module are created, and the connection between the data streams is established.

S2602, in response to the deletion operation from the user, stopping synchronous rendering of the first caption, so as to stop synchronous display of the first caption while playing the to-be-played multimedia file.

In some embodiments, the stopping of synchronous rendering of the first caption is to find the first caption through the identification information of the target caption and stop synchronous rendering of the first caption.

In the above embodiment, by receiving a deletion operation from the user, the synchronous rendering of the first caption can be stopped in response to the deletion operation from the user, so as to stop synchronously displaying the first caption when playing the multimedia file. The user can customize the deletion of unnecessary captions according to current needs, thereby improving the user experience.

Figure 27:
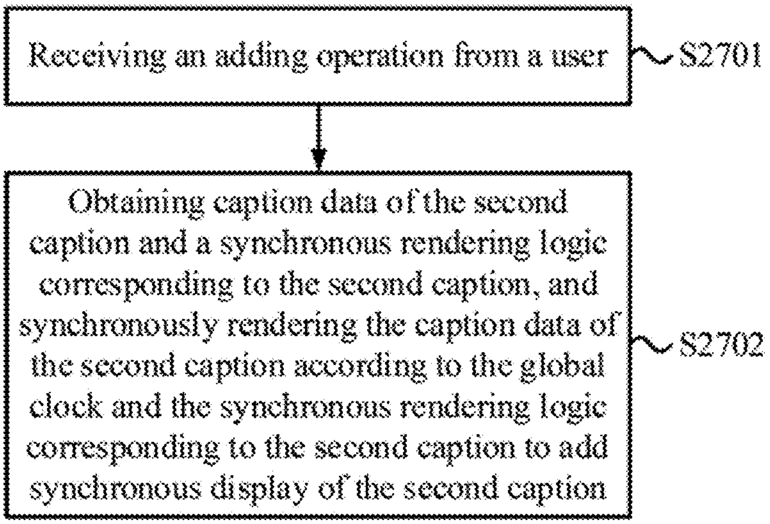
FIG. 27 is a flowchart of another caption display method according to some embodiments.

As an extension and refinement of the above embodiment, as shown in FIG. 27, the caption display method provided in the embodiment of the present disclosure further includes the following S2701 and S2702.

S2701, receiving an adding operation from a user.

The adding operation is used to add a synchronous display of a second caption other than the to-be-output captions.

For example, captions 3 and 4 are currently being displayed on the current display device, and the second caption is caption 5. At this time, the user wants to display caption 5 on the display device, or wants to switch caption 4 to caption 5. The user can add caption 5 to be displayed through the touch button of the remote control or user interface of the display device, or delete caption 4 first and then add caption 5.

S2702, obtaining caption data of the second caption and a synchronous rendering logic corresponding to the second caption, and synchronously rendering the caption data of the second caption according to the global clock and the synchronous rendering logic corresponding to the second caption to add synchronous display of the second caption.

In the above embodiment, by receiving the adding operation from the user, the caption data of the second caption and the synchronous rendering logic corresponding to the second caption are obtained, and the caption data of the second caption is synchronously rendered according to the global clock and the synchronous rendering logic corresponding to the second caption, so as to add the synchronous display of the second caption. The user can customize and add the captions that need to be displayed according to the current needs, thereby improving the user experience.

Figure 28:
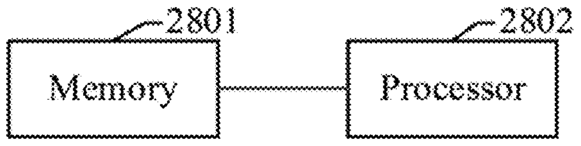
FIG. 28 is a schematic diagram of a structure of an electronic device according to some embodiments.

FIG. 28 is a schematic diagram of the structure of an electronic device according to some embodiments. The device can implement the audio processing method described in any embodiment of the present disclosure. The device specifically includes the following: a memory 2801 and a processor 2802.

Wherein, the memory 2801 is configured to store computer instructions.

The processor 2802 is connected to the memory 2801 and is configured to perform the following steps when executing the computer instructions:

- based on that a to-be-played multimedia file comprises multiple channels of audio tracks, parsing the to-be-played multimedia file to obtain the multiple channels of audio tracks of the to-be-played multimedia file;
- determining at least two channels of target audio tracks from the multiple channels of audio tracks, and establishing a corresponding relationship between each channel of target audio track and each playback earphone;
- decoding each channel of target audio track based on a preset decoder corresponding to each channel of target audio track to obtain a pulse modulation code corresponding to each channel of target audio track;
- playing each channel of target audio track through the playback earphone corresponding to each channel of target audio track based on the pulse modulation code corresponding to each channel of target audio track and the corresponding relationship between each channel of target audio track and each playback earphone.

As an optional implementation of the embodiment of the present disclosure, the processor 2802 is further used to obtain parameter information corresponding to each channel of target audio track; based on the parameter information corresponding to each channel of target audio track, establish the preset decoder corresponding to each channel of target audio track.

As an optional implementation of the embodiment of the present disclosure, the processor 2802 includes a hard decoder and a soft decoder; the parameter information includes: an audio sampling rate, the number of soundtracks and a bit rate.

The processor 2802 is specifically used to perform a product operation on the audio sampling rate, the number of soundtracks and the bit rate of each channel of target audio track to obtain a product operation result of each channel of target audio track; establish the hard decoder for a target audio track corresponding to a maximum product operation result, and establish the soft decoder for other target audio tracks.

As an optional implementation of the embodiment of the present disclosure, the processor 2802 is further used to, based on that each channel of target audio track is played through the playback earphone corresponding to each channel of target audio track, synchronously play videos and captions contained in the to-be-played multimedia file based on a target synchronization clock.

As an optional implementation of the embodiment of the present disclosure, the processor 2802 is further configured to decode elementary streams corresponding to the videos and captions respectively contained in the to-be-played multimedia file, to obtain initial data corresponding to the videos and captions respectively.

The processor 2802 is specifically configured to synchronously play the videos and captions included in the to-be-played multimedia file based on the target synchronization clock and the initial data corresponding to the video and the captions, respectively.

As an optional implementation of the embodiment of the present disclosure, the processor 2802 is also used to determine an audio clock corresponding to each channel of target audio track; and determine a target synchronization clock from a plurality of audio clocks, wherein the target synchronization clock is used to synchronously play the video, captions and at least two channels of target audio tracks contained in the to-be-played multimedia file.

As an optional implementation of the embodiment of the present disclosure, the processor 2802 is specifically used to determine a first target audio track corresponding to a maximum product operation result based on a product operation result of each channel of target audio track; and determine an audio clock of the first target audio track as the target synchronization clock.

As an optional implementation of the embodiment of the present disclosure, the processor 2802 is specifically used to determine a second target audio track corresponding to a preset decoder that is a last audio track to finish the establishment when a corresponding preset decoder is established for each channel of target audio track; and determine an audio clock of the second target audio track as the target synchronization clock.

As an optional implementation of the embodiment of the present disclosure, the processor 2802 is further configured to switch the target audio track currently being played when receiving a switching instruction input from a user.

In this way, in this embodiment, when it is determined that the to-be-played multimedia file contains multiple channels of audio tracks, the to-be-played multimedia file is parsed to obtain the multiple channels of audio tracks of the to-be-played multimedia file; at least two channels of target audio tracks are determined from the multiple channels of audio tracks, and a corresponding relationship between each channel of target audio track and each playback earphone is established; based on the preset decoder corresponding to each channel of target audio track, each channel of target audio track is decoded to obtain the pulse modulation code corresponding to each channel of target audio track; based on the pulse modulation code corresponding to each channel of target audio track and the corresponding relationship between each channel of target audio track and each playback earphone, the target audio track is played through the playback earphone corresponding to each channel of target audio track. In the above process, the multiple channels of audio tracks contained in the to-be-played multimedia file can be determined according to different user needs, and the corresponding relationship between each channel of target audio track and each playback earphone is established, so that different playback earphones can play the multiple channels of target audio tracks contained in the same to-be-played multimedia file at the same time, and the playback of multiple channels of audio tracks is realized, so as to meet the audio playback needs of different users for the to-be-played multimedia file, so that each user can listen to the audio they need, and improve the user experience.

Figure 29:
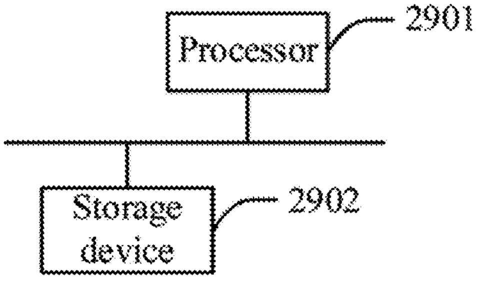
FIG. 29 is a schematic diagram of a structure of a smart device according to some embodiments.

FIG. 29 is a schematic diagram of the structure of a smart device according to some embodiments. As shown in FIG. 29, the smart device includes a processor 2901 and a memory (also referred to as a storage device) 2902; the number of processors 2901 in the smart device can be one or more, and FIG. 29 takes one processor 2901 as an example; the processor 2901 and the storage device 2902 in the smart device can be connected via a bus or other means, and FIG. 29 takes the connection via a bus as an example.

The storage device 2902 is a computer-readable storage medium that can be used to store software programs, computer executable programs and modules, such as program instructions/modules corresponding to the audio processing method in the embodiment of the present disclosure. The processor 2901 executes various functional applications and data processing of the smart device by running the software programs, instructions and modules stored in the storage device 2902, that is, the audio processing method provided in the embodiments of the present disclosure is implemented.

The storage device 2902 can mainly include a program storage area and a data storage area, wherein the program storage area can store an operating system and at least one application required for a function; the data storage area can store data created according to the use of the terminal, etc. In addition, the storage device 2902 can include a high-speed random access memory, and can also include a non-volatile memory, such as at least one disk storage device, a flash memory device, or other non-volatile solid-state storage device. In some instances, the storage device 2902 can further include a memory remotely arranged relative to the processor 2901, and these remote memories can be connected to the smart device via a network. Embodiments of the above-mentioned network include, but are not limited to, the Internet, an intranet, a local area network, a mobile communication network, and combinations thereof.

The smart device provided in this embodiment can be used to execute the audio processing method provided in any of the above embodiments, and has corresponding functions and beneficial effects.

An embodiment of the present disclosure provides a computer-readable non-volatile storage medium, on which computer programs are stored. When the computer programs are executed by a processor, the various processes of any of the above methods are implemented and the same technical effects can be achieved. To avoid repetition, they are not described here.

The computer-readable storage medium can be a read-only memory (ROM), a random access memory (RAM), a magnetic disk or an optical disk, etc.

In some embodiments, the embodiments of the present disclosure provide a computer program product, which, when executed on a computer, enables the computer to implement any of the above methods.

For the convenience of explanation, the above description has been made in conjunction with specific embodiments. However, the above discussion in some embodiments is not intended to be exhaustive or limit the embodiments to the specific forms disclosed above. Based on the above teachings, various modifications and variations can be obtained. The selection and description of the above embodiments are to better explain the principles and practical applications, so that those skilled in the art can better use the embodiments and various different variations of the embodiments suitable for specific use considerations.

What is claimed is:

1. An audio processing method, comprising:

based on that a to-be-played multimedia file comprises multiple channels of audio tracks, parsing the to-be-played multimedia file to obtain the multiple channels of audio tracks of the to-be-played multimedia file;

determining at least two channels of target audio tracks from the multiple channels of audio tracks according to a selection instruction input from a user, and establishing a corresponding relationship between each channel of target audio track and each playback earphone;

decoding each channel of target audio track based on a preset decoder corresponding to each channel of target audio track to obtain a pulse modulation code corresponding to each channel of target audio track;

playing each channel of target audio track through the playback earphone corresponding to each channel of target audio track based on the pulse modulation code corresponding to each channel of target audio track and the corresponding relationship between each channel of target audio track and each playback earphone.

2. The method according to claim 1, wherein before decoding each channel of target audio track based on the preset decoder corresponding to each channel of target audio track, the method further comprises:

obtaining parameter information corresponding to each channel of target audio track;

establishing the preset decoder corresponding to each channel of target audio track based on the parameter information corresponding to each channel of target audio track.

3. The method according to claim 2, wherein the preset decoder comprises a hard decoder and a soft decoder; the parameter information comprises: an audio sampling rate, a quantity of soundtracks and a bit rate;

the establishing the preset decoder corresponding to each channel of target audio track based on the parameter information corresponding to each channel of target audio track, comprises:

performing a product operation on the audio sampling rate, the quantity of soundtracks, and the bit rate of each channel of target audio track to obtain a product operation result of each channel of target audio track;

establishing the hard decoder for a target audio track corresponding to a maximum product operation result, and establishing the soft decoder for other target audio tracks.

4. The method according to claim 1, further comprising: based on that each channel of target audio track is played through the playback earphone corresponding to each channel of target audio track, synchronously playing videos and captions contained in the to-be-played multimedia file based on a target synchronization clock.

5. The method according to claim 4, wherein the synchronously playing the videos and captions contained in the to-be-played multimedia file based on the target synchronization clock comprises:

decoding elementary streams corresponding to the videos and captions contained in the to-be-played multimedia file to obtain initial data respectively corresponding to the videos and captions;

synchronously playing the videos and captions contained in the to-be-played multimedia file based on the target synchronization clock and the initial data respectively corresponding to the videos and the captions.

6. The method according to claim 4, wherein before parsing elementary streams corresponding to the videos and captions contained in the to-be-played multimedia file to obtain initial data respectively corresponding to the videos and captions, the method further comprises:

determining an audio clock corresponding to each channel of target audio track;

determining the target synchronization clock from a plurality of audio clocks, wherein the target synchronization clock is used to synchronously play the videos, captions and at least two channels of target audio tracks contained in the to-be-played multimedia file.

7. The method according to claim 6, wherein the determining the target synchronization clock from the plurality of audio clocks, comprises:

determining a first target audio track corresponding to a maximum product operation result based on a product operation result of each channel of target audio track;

determining an audio clock of the first target audio track as the target synchronization clock.

8. The method according to claim 6, wherein the determining the target synchronization clock from the plurality of audio clocks, comprises:

based on that a corresponding preset decoder is established for each channel of target audio track, determining a second target audio track corresponding to a preset decoder that is a last audio track to finish the establishment;

determining an audio clock of the second target audio track as the target synchronization clock.

9. The method according to claim 1, further comprising: based on that a switching instruction input from the user is received, switching the target audio track currently being played.

10. The method according to claim 4, wherein based on that each channel of target audio track is played through the playback earphone corresponding to each channel of target audio track, playing the captions contained in the to-be-played multimedia file, comprises:

receiving a selection operation from the user;

in response to the selection operation, determining one or more channels of to-be-output captions from the captions contained in the to-be-played multimedia file;

obtaining caption data of each channel of to-be-output caption;

obtaining a global clock of a playback pipeline of the to-be-played multimedia file and a synchronous rendering logic corresponding to each channel of to-be-output caption;

based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

11. An electronic device, comprising:

a memory configured to store computer instructions;

at least one processor, in connection with the memory, and is configured to execute the following steps when executing the computer instructions:

based on that a to-be-played multimedia file comprises multiple channels of audio tracks, parsing the to-be-played multimedia file to obtain the multiple channels of audio tracks of the to-be-played multimedia file;

determining at least two channels of target audio tracks from the multiple channels of audio tracks according to a selection instruction input from a user, and establishing a corresponding relationship between each channel of target audio track and each playback earphone;

decoding each channel of target audio track based on a preset decoder corresponding to each channel of target audio track to obtain a pulse modulation code corresponding to each channel of target audio track;

playing each channel of target audio track through the playback earphone corresponding to each channel of target audio track based on the pulse modulation code corresponding to each channel of target audio track and the corresponding relationship between each channel of target audio track and each playback earphone.

12. The electronic device according to claim 11, wherein the at least one processor is further configured to execute:

obtaining parameter information corresponding to each channel of target audio track;

establishing the preset decoder corresponding to each channel of target audio track based on the parameter information corresponding to each channel of target audio track.

13. The electronic device according to claim 12, wherein the preset decoder comprises a hard decoder and a soft decoder; the parameter information comprises: an audio sampling rate, a quantity of soundtracks and a bit rate;

wherein the at least one processor is further configured to execute:

performing a product operation on the audio sampling rate, the quantity of soundtracks, and the bit rate of each channel of target audio track to obtain a product operation result of each channel of target audio track;

establishing the hard decoder for a target audio track corresponding to a maximum product operation result, and establishing the soft decoder for other target audio tracks.

14. The electronic device according to claim 11, wherein the at least one processor is further configured to execute:

based on that each channel of target audio track is played through the playback earphone corresponding to each channel of target audio track, synchronously playing videos and captions contained in the to-be-played multimedia file based on a target synchronization clock.

15. The electronic device according to claim 14, wherein the at least one processor is further configured to execute:

decoding elementary streams corresponding to the videos and captions contained in the to-be-played multimedia file to obtain initial data respectively corresponding to the videos and captions;

synchronously playing the videos and captions contained in the to-be-played multimedia file based on the target synchronization clock and the initial data respectively corresponding to the videos and the captions.

16. The electronic device according to claim 14, wherein the at least one processor is further configured to execute:

determining an audio clock corresponding to each channel of target audio track;

determining the target synchronization clock from a plurality of audio clocks, wherein the target synchronization clock is used to synchronously play the videos, captions and at least two channels of target audio tracks contained in the to-be-played multimedia file.

17. The electronic device according to claim 16, wherein the at least one processor is further configured to execute:

determining a first target audio track corresponding to a maximum product operation result based on a product operation result of each channel of target audio track;

determining an audio clock of the first target audio track as the target synchronization clock.

18. The electronic device according to claim 16, wherein the at least one processor is further configured to execute:

based on that a corresponding preset decoder is established for each channel of target audio track, determining a second target audio track corresponding to a preset decoder that is a last audio track to finish the establishment;

determining an audio clock of the second target audio track as the target synchronization clock.

19. The electronic device according to claim 11, wherein the at least one processor is further configured to execute:

based on that a switching instruction input from the user is received, switching the target audio track currently being played.

20. The electronic device according to claim 14, wherein the at least one processor is further configured to execute:

receiving a selection operation from the user;

in response to the selection operation, determining one or more channels of to-be-output captions from the captions contained in the to-be-played multimedia file;

obtaining caption data of each channel of to-be-output caption;

obtaining a global clock of a playback pipeline of the to-be-played multimedia file and a synchronous rendering logic corresponding to each channel of to-be-output caption;

based on the global clock and the synchronous rendering logic corresponding to each channel of to-be-output caption, synchronously rendering the caption data of each channel of to-be-output caption, so as to synchronously display each channel of to-be-output caption while playing the to-be-played multimedia file.

* * * * *